(12) United States Patent
Otani

(10) Patent No.: US 10,416,424 B2
(45) Date of Patent: *Sep. 17, 2019

(54) LIGHT OUTPUTTING APPARATUS AND IMAGE DISPLAY SYSTEM

(71) Applicant: SEIKO EPSON CORPORATION, Tokyo (JP)

(72) Inventor: Makoto Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/925,977

(22) Filed: Mar. 20, 2018

(65) Prior Publication Data

US 2018/0284410 A1 Oct. 4, 2018

(30) Foreign Application Priority Data

Mar. 28, 2017 (JP) .................................. 2017-062392

(51) Int. Cl.
| | |
|---|---|
| G02B 19/00 | (2006.01) |
| G06F 3/042 | (2006.01) |
| G02B 27/28 | (2006.01) |
| G02B 27/09 | (2006.01) |
| G02B 27/30 | (2006.01) |

(Continued)

(52) U.S. Cl.
CPC ....... *G02B 19/0014* (2013.01); *G02B 19/009* (2013.01); *G02B 19/0047* (2013.01); *G02B 27/0927* (2013.01); *G02B 27/0961* (2013.01); *G02B 27/286* (2013.01); *G02B 27/30* (2013.01); *G03B 21/208* (2013.01); *G03B 21/2013* (2013.01); *G06F 3/0425* (2013.01); *G02B 5/045* (2013.01)

(58) Field of Classification Search
CPC ............ G02B 19/0014; G02B 19/0047; G02B 19/009; G02B 27/0927; G02B 27/0961; G02B 27/286; G02B 27/30; G02B 5/045; G06F 3/0425; G03B 21/2013; G03B 21/208

See application file for complete search history.

(56) References Cited

U.S. PATENT DOCUMENTS

| | | | | |
|---|---|---|---|---|
| 2012/0002217 | A1* | 1/2012 | Kobayashi | G06F 3/0428 356/622 |
| 2013/0301058 | A1* | 11/2013 | Nunnink | G01B 11/00 356/606 |
| 2015/0116216 | A1 | 4/2015 | Sakai et al. | |

FOREIGN PATENT DOCUMENTS

JP 2015-111385 A 6/2015

* cited by examiner

*Primary Examiner* — Nelson M Rosario
(74) *Attorney, Agent, or Firm* — Oliff PLC

(57) ABSTRACT

A light outputting apparatus includes a first light outputting section and a second light outputting section. The first light outputting section includes a first light source, a first collimator lens, and a first optical element that widens light having passed through the first collimator lens, and the second light outputting section includes a second light source, a second collimator lens, and a second optical element that widens light having passed through the second collimator lens. The first light outputting section and the second light outputting section are so disposed that a first optical path and a second optical path intersect each other at a point on upstream optical paths of the first and second optical elements, and that part of the light outputted from the first light outputting section and part of the light outputted from the second light outputting section overlap with each other.

18 Claims, 10 Drawing Sheets

(51) Int. Cl.
*G03B 21/20* (2006.01)
*G02B 5/04* (2006.01)

FIG.10

| | FIRST SURFACE 3311 | SECOND SURFACE 3312 |
|---|---|---|
| r | 0.235 | 0.235 |
| k | -0.54 | -0.6 |
| A1 | 0 | 0 |
| A2 | 0 | 0 |
| A3 | -5.43230E-01 | 3.62150E+00 |
| A4 | -4.85440E+00 | 5.39380E+00 |
| A5 | 9.83670E+00 | 0.00000E+00 |
| A6 | 7.11590E+01 | 2.51150E+02 |
| A7 | 0.00000E+00 | 0.00000E+00 |
| A8 | -1.51590E+02 | -2.27390E+03 |
| A9 | 0.00000E+00 | 0.00000E+00 |
| A10 | -2.28750E+03 | -1.37250E+04 |
| A11 | 0.00000E+00 | 0.00000E+00 |
| A12 | 0.00000E+00 | -2.07110E+05 |
| A13 | 0.00000E+00 | 0.00000E+00 |
| A14 | 0.00000E+00 | -3.60020E+06 |
| A15 | 0.00000E+00 | 0.00000E+00 |
| A16 | 0.00000E+00 | -5.43270E+06 |
| A17 | 0.00000E+00 | 0.00000E+00 |
| A18 | 0.00000E+00 | 9.83730E+07 |
| A19 | 0.00000E+00 | 0.00000E+00 |
| A20 | 0.00000E+00 | 2.67200E+09 |

FIG.11

| | FIRST SURFACE 3311 | SECOND SURFACE 3312 |
|---|---|---|
| r | 0.245 | 0.245 |
| k | -1.04 | -1.1 |
| A1 | 0 | 0 |
| A2 | 0 | 0 |
| A3 | -2.66556E-01 | 3.99833E+00 |
| A4 | -1.35998E+00 | 1.49598E+01 |
| A5 | 9.99167E+00 | -2.85873E+01 |
| A6 | 5.77750E+01 | 3.77237E+02 |
| A7 | 0.00000E+00 | 0.00000E+00 |
| A8 | -2.07601E+02 | -6.30353E+03 |
| A9 | 0.00000E+00 | 0.00000E+00 |
| A10 | 0.00000E+00 | -2.70398E+04 |
| A11 | 0.00000E+00 | 0.00000E+00 |
| A12 | 9.95237E+03 | -2.87047E+06 |
| A13 | 0.00000E+00 | 0.00000E+00 |
| A14 | 0.00000E+00 | -8.72652E+05 |
| A15 | 0.00000E+00 | 0.00000E+00 |
| A16 | 0.00000E+00 | 1.14270E+09 |
| A17 | 0.00000E+00 | 0.00000E+00 |
| A18 | 0.00000E+00 | 0.00000E+00 |
| A19 | 0.00000E+00 | 0.00000E+00 |
| A20 | 0.00000E+00 | 0.00000E+00 |

LIGHT OUTPUTTING APPARATUS AND IMAGE DISPLAY SYSTEM

BACKGROUND

1. Technical Field

The present invention relates to a light outputting apparatus and an image display system.

2. Related Art

There has been a known image display system that detects the position of a pointing element (pen or user's finger, for example) operated on a display surface on which an image is displayed and, based on the result of the detection, performs display operation according to the trajectory of the pointing element and changes the display operation. For example, there is a disclosed image display system which includes a projector and a light outputting apparatus that outputs light along a projection surface (target flat surface), such as a screen and a whiteboard, on which the projector performs projection and in which the projector detects the position of a pointing element operated on the projection surface based on the light reflected off the pointing element and performs the projection based on the result of the detection (JP-A-2015-111385, for example).

The light outputting apparatus described in JP-A-2015-111385 includes a first light outputting section and a second light outputting section, each of which includes a light source, a collimation lens that parallelizes light emitted from the light source, and a directional lens (Powell lens) that widens the light parallelized by the collimation lens and extending in a predetermined direction. The light outputting apparatus is disposed on one side of the projection surface and so configured that the center axis of the light flux outputted by the first light outputting section and the center axis of the light flux outputted by the second light outputting section form an angle that increases as the light fluxes travel along the respective light output directions, and that part of the light outputted by the first light outputting section and part of the light outputted by the second light outputting section overlap with each other in an area along the projection surface.

However, since the light outputted from the first light outputting section and the light outputted from the second light outputting section overlap with each other in a portion greatly separate from the light outputting apparatus, the light outputting apparatus described in JP-A-2015-111385 cannot undesirably output light having pointing element detectable intensity over an area close to the light outputting apparatus.

SUMMARY

An advantage of some aspects of the invention is to solve at least a part of the problems described above, and the invention can be implemented as the following forms or application examples.

Application Example 1

A light outputting apparatus according to this application example includes a first light outputting section and a second light outputting section that output light fluxes having center axes extending in directions different from each other. The first light outputting section includes a first light source that emits light, a first collimator lens for parallelizing the light emitted from the first light source, and a first optical element that widens in a first predetermined direction light having passed through the first collimator lens. The second light outputting section includes a second light source that emits light, a second collimator lens for parallelizing the light emitted from the second light source, and a second optical element that widens in a second predetermined direction light having passed through the second collimator lens. The first light outputting section and the second light outputting section are so disposed that a first optical path extending from the first light source to the first optical element and a second optical path extending from the second light source to the second optical element intersect each other at a point on upstream optical paths of the first optical element and the second optical element and part of the light outputted by the first light outputting section and part of the light outputted by the second light outputting section overlap with each other.

According to the configuration described above, the light outputting apparatus includes the first and second light outputting sections, which output light fluxes having center axes extending in directions different from each other, and the first and second light outputting sections each include the light source, the collimator lens, and the optical element described above. Therefore, disposing the light outputting apparatus on one side of a target predetermined flat surface (target flat surface) in such a way that the first and second predetermined directions extend along the target flat surface allows the light outputting apparatus to output light along a wide target flat surface by using the light fluxes emitted from the first and second light sources.

Further, the first and second light outputting sections are so disposed that the optical paths thereof intersect each other as described above. Therefore, the light outputting apparatus can be so configured that the first and second optical elements are close to each other, and the position where part of the light outputted from the first light outputting section and part of the light outputted from the second light outputting section overlap with each other is allowed to approach the target flat surface. Therefore, the size of the light outputting apparatus can be reduced in the direction in which the first and second optical elements are juxtaposed with each other (the direction is called a juxtaposition direction), and the light outputting apparatus can output light having sufficient optical intensity over an area close to the light outputting apparatus.

Application Example 2

In the light outputting apparatus according to the application example described above, it is preferable that the first light source and the second light source each have a light emitting portion larger in a first direction perpendicular to an optical axis of the first light source than in a second direction perpendicular to an optical axis of the second light source and to the first direction, that the first predetermined direction is a direction corresponding to the first direction perpendicular to the optical axis of the first light source, that the second predetermined direction is a direction corresponding to the first direction perpendicular to the optical axis of the second light source, that the first optical element widens light incident thereon only in the first predetermined direction, and that the second optical element widens light incident thereon only in the second predetermined direction.

According to the configuration described above, since the light from the light emitting portion that is part of the first light source and is smaller in the second direction than in the first direction is incident on the first collimator lens, the light having exited out of the first collimator lens is light more parallelized in the second direction than in the first direction. The first optical element then widens the light incident thereon only in the direction corresponding to the first direction. Similarly, the light having exited out of the second collimator lens is light more parallelized in the second direction than in the first direction in the second light source. The second optical element then widens the light incident thereon only in the direction corresponding to the first direction. The light outputting apparatus can therefore efficiently output light along the target flat surface over a wider range.

Application Example 3

In the light outputting apparatus according to the application example described above, it is preferable that the first optical element includes a plurality of lenslets that are arranged along a direction corresponding to the first predetermined direction and widen light incident on the lenslets, and that the second optical element includes a plurality of lenslets that are arranged along a direction corresponding to the second predetermined direction and widen light incident on the lenslets.

According to the configuration described above, in the light outputting apparatus, the first and second optical elements each include the plurality of lenslets, and the plurality of lenslets each widen the light incident thereon. The light outputted from the first light outputting section (first optical element) and the light outputted from the second light outputting section (second optical element) are therefore each formed of light fluxes widened by the plurality of lenslets and superimposed on one another.

The first light outputting section can therefore provide sufficient optical intensity in the entire area along the target flat surface even in a case where the precision in the alignment between the first light source and the first optical element is relaxed, unlike a configuration in which the member that widens light incident thereon is formed of a single lens. Similarly, the second light outputting section can provide sufficient optical intensity in the entire area along the target flat surface even in a case where the precision in the alignment between the second light source and the second optical element is relaxed.

Therefore, the assembly man-hour (position adjustment man-hour) can be reduced, and sufficient optical intensity can be provided over the entire area along the target flat surface.

Further, the degree of dependence on the intensity distribution of the light emitted from each of the first and second light sources can be reduced, whereby the first and second light sources can be selected with increased flexibility.

Application Example 4

In the light outputting apparatus according to the application example described above, it is preferable that the first optical element and the second optical element are integrated with each other.

According to the configuration described above, the area where the first optical element and the second optical element are disposed can therefore be reduced. Further, since the relative positional precision between the first optical element and the second optical element can be increased, the discrepancy between the intensity distribution of the light outputted by the first light outputting section and the intensity distribution of the light outputted by the second light outputting section can be suppressed. The light outputting apparatus provided by this application example therefore allows further reduction in the size thereof in the juxtaposition direction and can output light having further suppressed offset in the optical intensity distribution in the area along the target flat surface.

Application Example 5

In the light outputting apparatus according to the application example described above, it is preferable that the first collimator lens and the first optical element are disposed along an optical axis of the first light source, that the second collimator lens and the second optical element are disposed along an optical axis of the second light source, and that the first optical path and the second optical path intersect each other at a point between the first collimator lens and the first optical element and between the second collimator lens and the second optical element.

According to the configuration described above, the first and second light outputting sections output widened light fluxes having center axes that coincide with the optical axes of the first and second light sources. Therefore, the size of the light outputting apparatus in the juxtaposition direction can be reduced, and loss of the light fluxes emitted by the first send second light sources can be suppressed, whereby the light outputting apparatus provided by this application example can efficiently output light along the target flat surface.

Application Example 6

In the light outputting apparatus according to the application example described above, it is preferable that the first light source and the second light source are so disposed as to each emit light toward a side facing another, that the first light outputting section includes a first direction changer that changes a traveling direction of the light having passed through the first collimator lens, that the first optical element widens light having passed through the first direction changer, that the second light outputting section includes a second direction changer that changes a traveling direction of the light having passed through the second collimator lens, that the second optical element widens light having passed through the second direction changer, and that the first optical path and the second optical path intersect each other at a point between the first direction changer and the first optical element and between the second direction changer and the second optical element.

According to the configuration described above, the first light source and the second light source are so disposed as to each emit light toward the side facing the other, and the first and second light outputting sections include the first and second direction changers described above, respectively. The first optical path and the second optical path intersect each other, as described above. The area where the first and second light sources are disposed is therefore allowed to approach the area where the first and second optical elements are disposed, whereby the size of the light outputting apparatus in the direction that intersects the juxtaposition direction can be reduced when viewed from the side facing the target flat surface.

Application Example 7

In the light outputting apparatus according to the application example described above, it is preferable that the first light source and the second light source are so disposed as to each emit light toward a side facing another, that the first light outputting section includes a first polarization element that is disposed in a downstream optical path of the first collimator lens, transmits first polarized light, and reflects second polarized light, that the second light outputting section includes a second polarization element that is disposed in a downstream optical path of the second collimator lens, transmits the first polarized light, and reflects the second polarized light, that the light outputting apparatus further includes a first retardation element that is disposed between the first polarization element and the second polarization element and converts the first polarized light into the second polarized light, that the first optical element widens light having passed through the first polarization element, having been converted by the first retardation element, and having been reflected off the second polarization element, that the second optical element widens light having passed through the second polarization element, having been converted by the first retardation element, and having been reflected off the first polarization element, and the first optical path and the second optical path intersect each other at a point between the first optical element and the second polarization element and between the second optical element and the first polarization element.

According to the configuration described above, in the light outputting apparatus, the first light source and the second light source are so disposed as to each emit light toward the side facing the other, the light outputting apparatus includes the first retardation element described above, and the first optical path and the second optical path intersect each other as described above. The first and second light outputting sections include the first and second polarization elements described above, respectively. The area where the first and second light sources are disposed and the area where the first and second optical elements are disposed are therefore allowed to be close to each other with use of no special member for changing the traveling directions of the light fluxes from the first and second light sources. The light outputting apparatus is therefore formed of readily manufacturable members and allows reduction in the size thereof in a direction that intersects the juxtaposition direction when viewed from the side facing the target flat surface.

Application Example 8

In the light outputting apparatus according to the application example described above, it is preferable that the first light outputting section includes a second retardation element that is disposed between the first optical element and the second polarization element and converts the second polarized light into the first polarized light, that the second light outputting section includes a third retardation element that is disposed between the second optical element and the first polarization element and converts the second polarized light into the first polarized light, that the first optical element widens the first polarized light into which the second polarized light reflected off the second polarization element is converted by the second retardation element, that the second optical element widens the first polarized light into which the second polarized light reflected off the first polarization element is converted by the third retardation element, and the first optical path and the second optical path intersect each other at a point between the second retardation element and the first optical element and between the third retardation element and the second optical element.

According to the configuration described above, since the light outputting apparatus includes the second retardation element and the third retardation element disposed in the positions described above, occurrence of reflection at the optical elements can be avoided, whereby the light outputting apparatus can more efficiently perform the function thereof. Further, the components of the light outputting apparatus can be more readily manufactured.

Application Example 9

In the light outputting apparatus according to the application example described above, it is preferable that the first light source and the second light source each emit light toward the same side, that the first light outputting section includes a first mirror that reflects the light having passed through the first collimator lens in a direction that intersects an optical axis of the first light source, that the first optical element widens the light reflected off the first mirror, that the second light outputting section includes a second mirror that reflects the light having passed through the second collimator lens in a direction that intersects an optical axis of the second light source, that the second optical element widens the light reflected off the second mirror, and that the first optical path and the second optical path intersect each other at a point between the first mirror and the first optical element and between the second mirror and the second optical element.

According to the configuration described above, in the light outputting apparatus, the first and second light sources are so disposed as to each emit light toward the same side, and the first and second light outputting sections include the first and second mirrors, respectively, described above. Therefore, in addition to the arrangement in which the first and second light sources are close to each other, the area where the first and second light sources are disposed and the area where the first and second optical elements are disposed are allowed to approach each other when viewed from the side facing the target flat surface. The size of the light outputting apparatus in the juxtaposition direction and in a direction that intersects the juxtaposition direction when viewed from the side facing the target flat surface can therefore be reduced.

Application Example 10

An image display system according to this application example includes the light outputting apparatus described in any one of the application examples, a detection apparatus that detects a position where light outputted from the light outputting apparatus is reflected, and a projection apparatus that projects an image according to a result of the detection performed by the detection apparatus.

According to the configuration described above, the image display system, which includes the light outputting apparatus described above, can effectively use the light fluxes emitted from the first and second light sources to output light from one side of a projection surface (target flat surface), such as a screen and a whiteboard, along the projection surface. The image display system can therefore stably detect the position of a pointing element or any other object that reflects the light outputted along the projection surface, project an image according to the result of the detection, for example, an image containing the trajectory of the pointing element on the projection surface.

Further, the light outputting apparatus, which can be disposed in a position close to the projection surface, allows a wide area where the position of the pointing element or any other object can be detected on the projection surface on the side facing the light outputting apparatus.

BRIEF DESCRIPTION OF THE DRAWINGS

The invention will be described with reference to the accompanying drawings, wherein like numbers reference like elements.

FIG. 10 shows lens data on lenslets in an example of the optical element unit in the first embodiment.

FIG. 11 shows lens data on lenslets in another example of the optical element unit in the first embodiment.

DESCRIPTION OF EXEMPLARY EMBODIMENTS

First Embodiment

A light outputting apparatus and an image display system according to the present embodiment will be described below with reference to the drawings.

Figure 1:
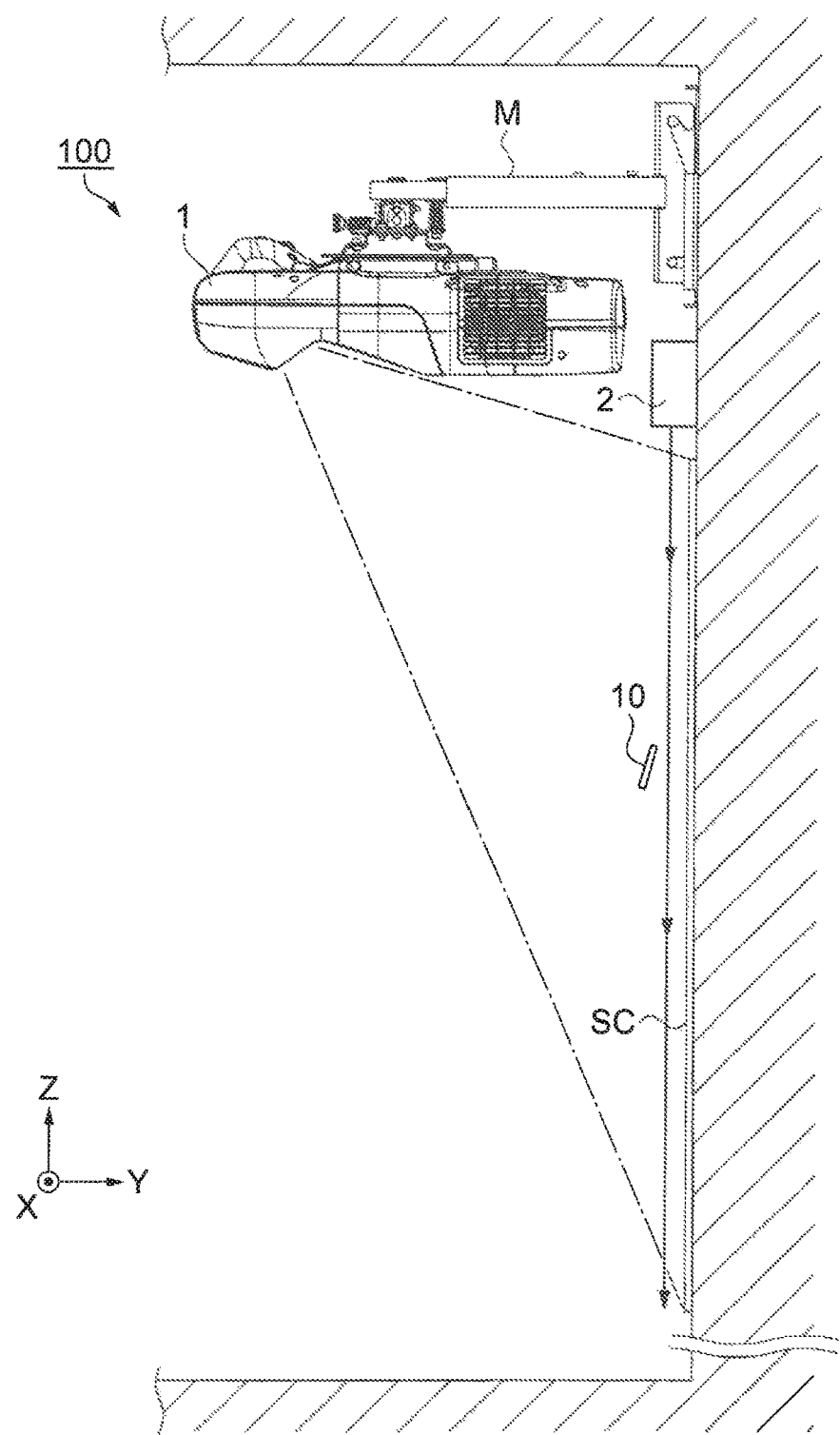
FIG. 1 is a diagrammatic view showing a schematic configuration of an image display system according to a first embodiment.

FIG. 1 is a diagrammatic view showing a schematic configuration of an image display system 100 according to the present embodiment.

The image display system 100 includes a projector 1 and a light outputting apparatus 2, as shown in FIG. 1.

Figure 2:
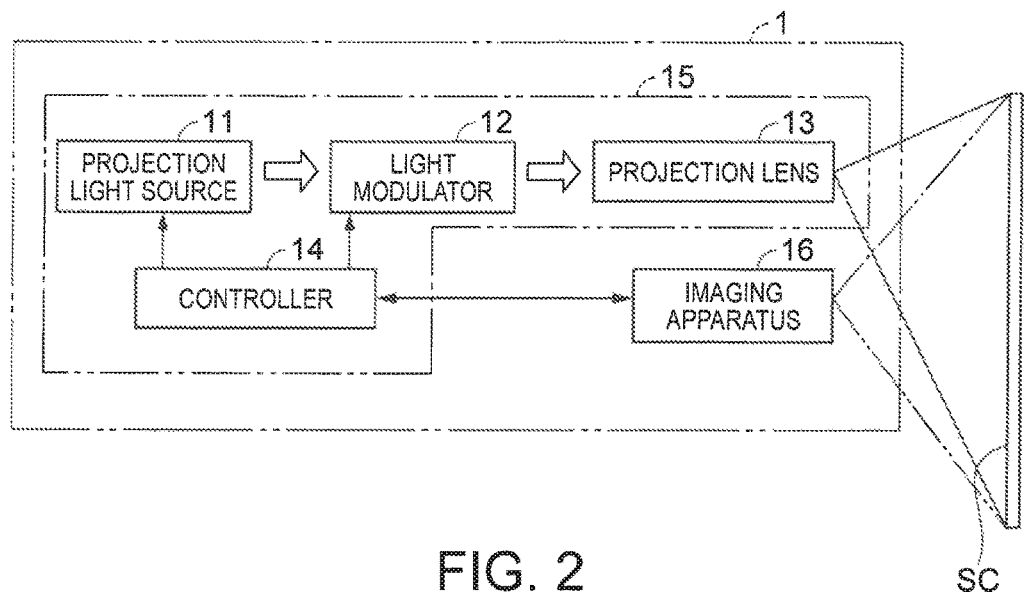
FIG. 2 is a block diagram showing a schematic configuration of a projector in the first embodiment.

FIG. 2 is a block diagram showing a schematic configuration of the projector 1.

The projector 1 includes a projection apparatus 15 and an imaging apparatus 16 as a detection apparatus, as shown in FIG. 2.

The projection apparatus 15 includes a projection light source 11, a light modulator 12, a projection lens 13, and a controller 14 and projects an image according to inputted image information and an image according to a result of the detection performed by the imaging apparatus 16.

The projector 1 is supported by a support apparatus M, which is installed on a wall surface above a projection surface SC, such as a screen and a whiteboard, and projects an image through the surface facing downward on the projection surface SC, as shown in FIG. 1. In the sections below, the directions are defined as follows for ease of description: The direction of a normal to the projection surface SC is a forward/rearward direction and the direction toward the projection surface SC is the forward direction (+Y direction); the direction against the gravity is an upward direction (+Z direction); and the right side corresponds to aright direction (+X direction) when viewed in the direction toward the projection surface SC.

In the projection apparatus 15, the light modulator 12 modulates light emitted from the projection light source 11 in accordance with image information, and the projection lens 13 projects the modulated light on the projection surface SC. The light modulator 12 can, for example, be a device using a liquid crystal panel or a micromirror-type device, for example, a device using a DMD (digital micromirror device).

The controller 14 includes a CPU (central processing unit), a ROM (read only memory), a RAM (random access memory), and other components, so that the controller 14 functions as a computer, and the controller 14 controls the action of the projector 1, for example, performs control relating to image projection based on information outputted from the imaging apparatus 16, which will be described later.

The light outputting apparatus 2, although the configuration thereof will be described later in detail, is installed on the wall surface above the projection surface SC, which is a target flat surface, and outputs light along the projection surface SC.

The imaging apparatus 16 includes an imaging device (not shown), for example, a CCD (charge coupled device) and a CMOS (complementary metal oxide semiconductor) device, captures an image of the projection surface SC as a subject, and outputs information on the captured image to the controller 14. When the light outputted from the light outputting apparatus 2 is reflected off a pointing element (pen 10 or user's finger, for example), the imaging apparatus 16 detects the position of the pointing element (reflection position) and outputs information on the detected position to the controller 14.

The projector 1 analyzes the position of the pointing element on the projection surface SC based on the information outputted from the imaging apparatus 16. Based on the result of the analysis, the projector 1, for example, projects a superimposed image formed of the image information on which a line representing the trajectory of the pointing element is superimposed, changes the projected image, and performs other types of operation.

Configuration of Light Outputting Apparatus

Figure 3:
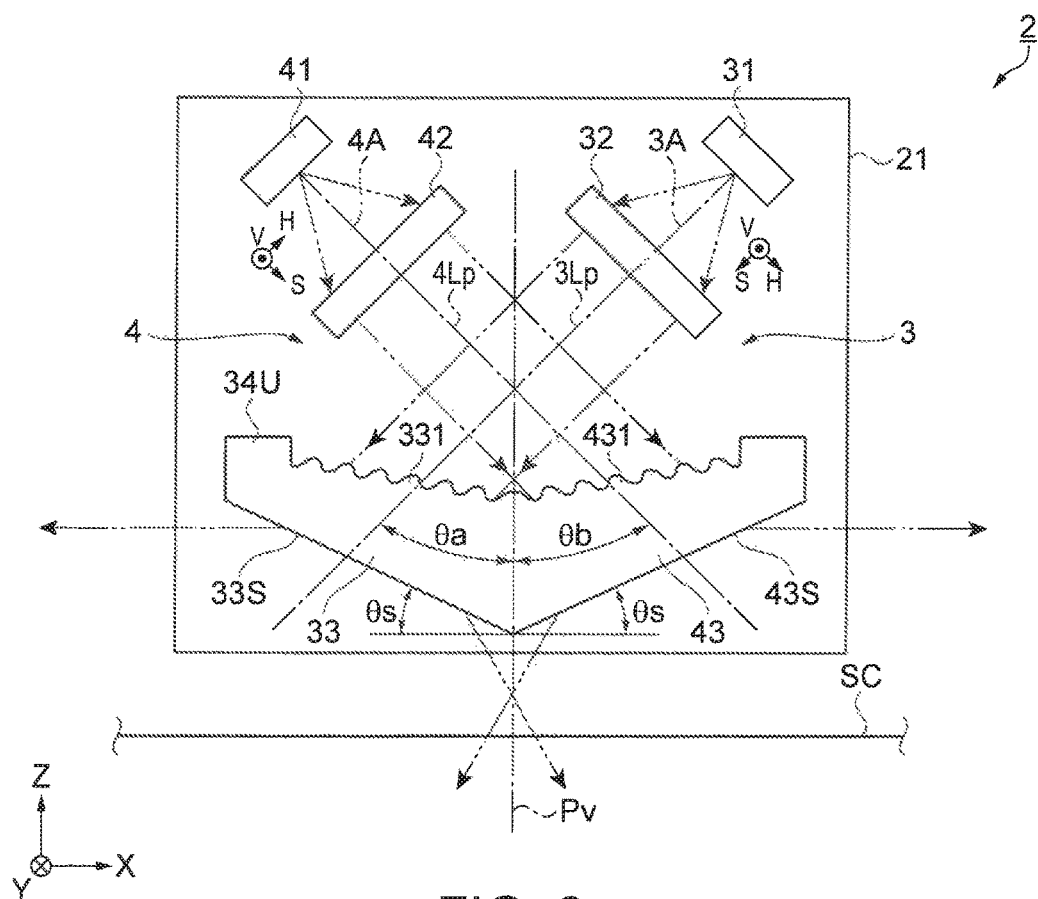
FIG. 3 is a diagrammatic view showing a schematic configuration of a light outputting apparatus in the first embodiment.

FIG. 3 is a diagrammatic view showing a schematic configuration of the light outputting apparatus 2.

The light outputting apparatus 2 is disposed in a position separate from the upper end of the projection surface SC and roughly at the center of the rightward/leftward direction of the projection surface SC, as shown in FIG. 3. The light outputting apparatus 2 includes a first light outputting section 3, a second light outputting section 4, and an enclosure 21, which accommodates these members.

The first light outputting section 3 and the second light outputting section 4 output light fluxes having center axes extending in directions different from each other.

The first light outputting section 3 includes a first light source 31, a first collimator lens 32, and a first optical element 33 and has a first optical path 3Lp, which extends from the first light source 31 to the first optical element 33. The first collimator lens 32 and the first optical element 33 are disposed along an optical axis 3A of the first light source 31, and the first light outputting section 3 outputs light obliquely leftward and downward.

The second light outputting section 4 includes a second light source 41, a second collimator lens 42, and a second optical element 43 and has a second optical path 4Lp, which extends from the second light source 41 to the second optical element 43, as the first light outputting section 3 does. The second collimator lens 42 and the second optical element 43 are disposed along an optical axis 4A of the second light source 41, and the second light outputting section 4 outputs light obliquely rightward and downward.

The first optical path 3Lp and the second optical path 4Lp intersect each other at a point between the first collimator lens 32 and the first optical element 33 and between the second collimator lens 42 and the second optical element 43. The light outputting apparatus 2 is so configured that part of the light outputted from the first light outputting section 3 and part of the light outputted from the second light outputting section 4 overlap with each other.

That is, the first light outputting section 3 and the second light outputting section 4 output light fluxes having center axes extending in directions inclining with respect to an imaginary central plane Pv, which is located between the first light outputting section 3 and the second light outputting section 4, is perpendicular to the projection surface SC, and extends in the upward/downward direction, as shown in FIG. 3. The first optical element 33 and the second optical element 43 are integrated with each other into an optical element unit 34U.

Specifically, the first light outputting section 3 is so disposed that the optical axis 3A and the imaginary central plane Pv form an inclination angle θa, by which the optical axis 3A inclines with respect to the imaginary central plane Pv clockwise (obliquely leftward and downward) when viewed in the direction -Y. The second light outputting section 4 is so disposed that the optical axis 4A and the imaginary central plane Pv form an inclination angle θb, by which the optical axis 4A inclines with respect to the imaginary central plane Pv counterclockwise (obliquely rightward and downward) when viewed in the direction -Y. Further, the first light outputting section 3 and the second light outputting section 4 in the present embodiment are so disposed as to be roughly symmetric with respect to the imaginary central plane Pv. The first light outputting section 3 and the second light outputting section 4 output light fluxes in such a way that part of the light outputted by the first light outputting section 3 and part of the light outputted by the second light outputting section 4 intersect each other at the imaginary central plane Pv so that the light fluxes as a whole cover an area across the entire projection surface SC.

Figure 4:
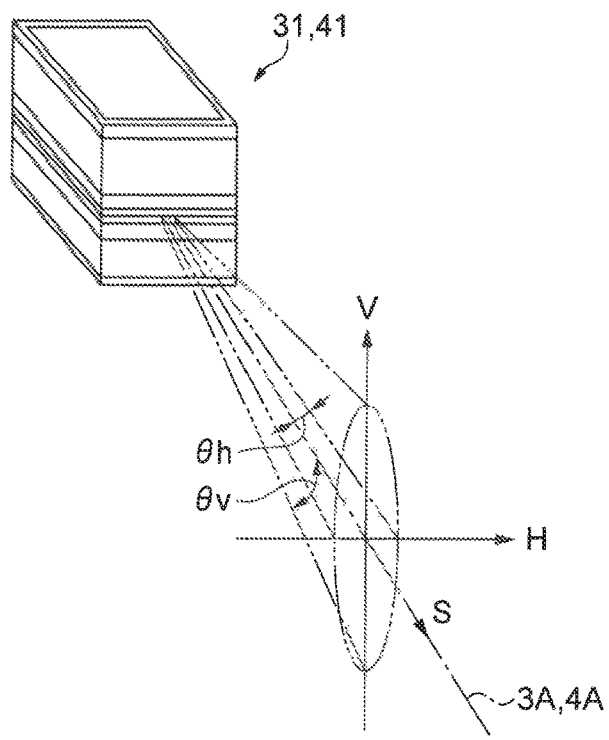
FIG. 4 is a perspective view diagrammatically showing a first light source and a second light source in the first embodiment.

FIG. 4 is a perspective view diagrammatically showing the first light source 31 and the second light source 41.

The first light source 31 and the second light source 41 are each, for example, a laser light source that emits light having optical intensity that peaks at about 940 nm and each include an active layer, which is a light emitting portion, cladding layers layered on opposite sides of the active layer, and other layers, as shown in FIG. 4. The light emitting portion is so formed as to be smaller in the direction in which the cladding layers are layered on the active layer (second direction V) than in the direction perpendicular to the second direction V (first direction H). The light emitted from each of the first light source 31 and the second light source 41 has optical intensity distributions different in the first direction H and the second direction V, and the first light source 31 and the second light source 41 each emit light having a center axis that coincides with an emission direction S perpendicular to the first direction H and the second direction V. The emission direction S, along which the first light source 31 and the second light source 41 emit light fluxes, is the direction extending along the optical axes 3A and 4A. That is, the first light source 31 emits light having optical intensity distributions different from each other between the first direction H and the second direction V, which are perpendicular to the optical axis 3A and to each other. Similarly, the second light source 41 emits light having optical intensity distributions different from each other between the first direction H and the second direction V, which are perpendicular to the optical axis 4A and to each other. The first light source 31 and the second light source 41 are each formed, for example, of a multi-mode-oscillation-type laser light source.

Referring back to FIG. 3, the first light source 31 and the second light source 41 are so disposed that the second direction V extends along the imaginary central plane Pv.

Further, the first light source 31 and the second light source 41 each emit polarized light in parallel to the first direction H, and P-polarized light is incident on the first optical element 33 and the second optical element 43. The configuration in which P-polarized light is incident on the first optical element 33 and the second optical element 43 suppresses optical loss at the first optical element 33 and the second optical element 43. This will be described later in detail.

The first collimator lens 32 and the second collimator lens 42 each have the function of parallelizing the light incident thereon. Specifically, the light in the second direction V having been emitted from the first light source 31 and having passed through the first collimator lens 32 travels roughly in parallel to the optical axis 3A. On the other hand, the light in the first direction H travels with slight inclination with respect to the optical axis 3A because the size of the light emitting portion of the first light source 31 is larger in the first direction H than in the second direction V. Similarly, the light in the second direction V having been emitted from the second light source 41 and having passed through the second collimator lens 42 travels roughly in parallel to the optical axis 4A, and the light in the first direction H travels with slight inclination with respect to the optical axis 4A.

The optical element unit 34U, which is formed of the first optical element 33 and the second optical element 43 integrated with each other, is made of a synthetic resin having a high refractive index and formed in a rectangular shape when viewed in the Z direction. The optical element unit 34U includes the first optical element 33 on the left and the second optical element 43 on the right and is formed in a bilaterally symmetric form, as shown in FIG. 3. That is, the optical element unit 34U is formed symmetrically with respect to the imaginary central plane Pv.

The first optical element 33 widens in a first predetermined direction the light having passed through the first collimator lens 32.

The first optical element 33 includes a plurality of lenslets 331 on the light incident side (side facing first collimator lens 32) and has a first reference surface 33S on the light exiting side.

The light incident side of the first optical element 33 inclines as a whole in such a way that the distance from the first collimator lens 32 to the light incident side increases with distance from the imaginary central plane Pv. The plurality of lenslets 331 each extend in the second direction V and are arranged along a direction in which the lenslets incline as a whole. The lenslets 331 each widen the light incident thereon in the first predetermined direction.

The first reference surface 33S inclines in such a way that it advances in the +Z direction with distance from the imaginary central plane Pv, and the first reference surface 33S and an X-Y plane, which is perpendicular to the imaginary central plane Pv (Y-Z plane), form an angle (reference plane angle θs).

The first optical element 33 widens the light incident thereon in the direction corresponding to the first direction H, which is perpendicular to the optical axis 3A, maintains in the second direction V the direction of the light parallelized by the first collimator lens 32, and outputs the resultant light having a center axis that coincides with the optical axis 3A. That is, the first predetermined direction is the direction corresponding to the first direction H, which is perpendicular to the optical axis 3A, and the plurality of lenslets 331 are arranged along the direction corresponding to the first predetermined direction. The first optical element 33 widens the light incident thereon only in the first predetermined direction. The light having exited out of the first optical element 33 is formed of the light fluxes widened by the plurality of lenslets 331 and superimposed on one another.

The second optical element 43 widens in a second predetermined direction the light having passed through the second collimator lens 42.

The second optical element 43 has a plurality of lenslets 431 and a second reference surface 43S, which are so configured that the plurality of lenslets 431 and the second reference surface 43S and the plurality of lenslets 331 and the first reference surface 33S of the first optical element 33 are symmetric with respect to the imaginary central plane Pv. The second optical element 43 widens the light incident thereon in the direction corresponding to the first direction H, which is perpendicular to the optical axis 4A, maintains in the second direction V the direction of the light parallelized by the second collimator lens 42, and outputs the resultant light having a center axis that coincides with the optical axis 4A. That is, the second predetermined direction is the direction corresponding to the first direction H, which is perpendicular to the optical axis 4A, and the plurality of lenslets 431 are arranged along the direction corresponding to the second predetermined direction. The second optical element 43 widens the light incident thereon only in the second predetermined direction. The light having exited out of the second optical element 43 is formed of the light fluxes widened by the plurality of lenslets 431 and superimposed on one another.

The lenslets 331 and 431 are each asymmetrically formed, which will be described later in detail.

The light outputting apparatus 2 is so disposed that the first direction H in each of the first light outputting section 3 and the second light outputting section 4 extends along the projection surface SC. The imaginary central plane Pv is a plane extending along the second direction V.

Since the first optical path 3Lp and the second optical path 4Lp intersect each other in the light outputting apparatus 2, the light outputted by the first light outputting section 3 and the light outputted by the second light outputting section 4 intersect each other in a position close to the light outputting apparatus 2, as shown in FIG. 3. That is, the light outputting apparatus 2 can output light having sufficient optical intensity in an area close to the light outputting apparatus 2. The thus configured light outputting apparatus 2 outputs light having pointing element detectable optical intensity also over an area that is part of the projection surface SC and in the vicinity of the light outputting apparatus 2 even in the case where the light outputting apparatus 2 is disposed in a position close to the projection surface SC.

Figure 5:
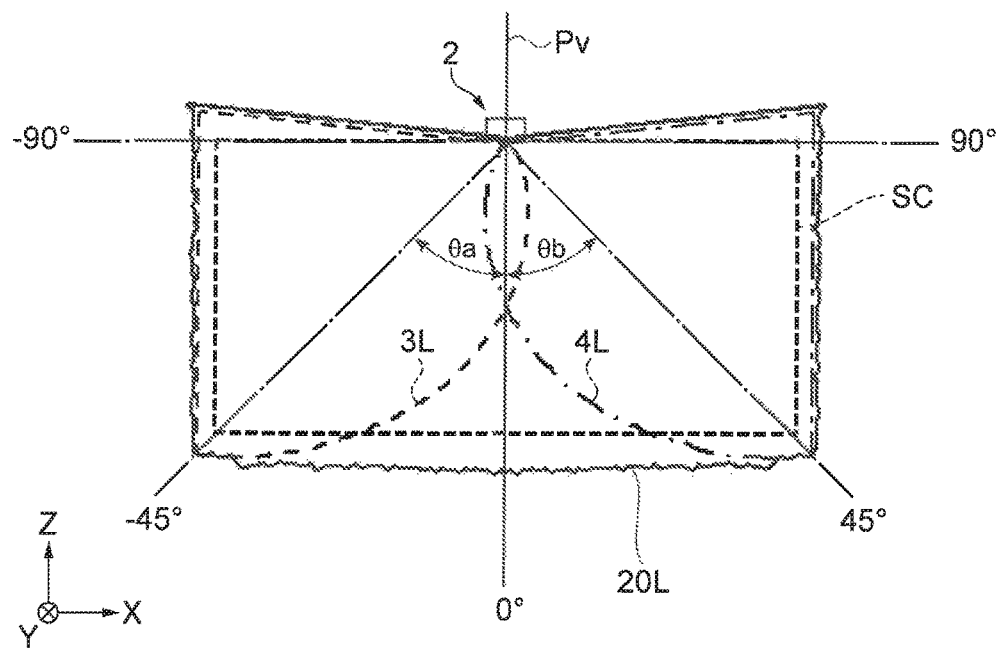
FIG. 5 is a diagrammatic view showing the intensity distribution of light outputted from the light outputting apparatus in the first embodiment.

FIG. 5 is a diagrammatic view showing the intensity distribution of the light outputted from the light outputting apparatus 2 and shows the intensity distribution in an area along the projection surface SC. Specifically, FIG. 5 shows an intensity distributions 3L of the light outputted from the first light outputting section 3 (first output light), an intensity distribution 4L of the light outputted from the second light outputting section 4 (second output light), and an intensity distribution 20L of combined light that is the combination of the first output light and the second output light.

Since the distance from the light outputting portion of each of the first light outputting section 3 and the second light outputting section 4 to the imaginary central plane Pv is significantly smaller than the size of the projection surface SC, it can be approximately assumed in the description of the intensity distribution that the light outputting portion of each of the first light outputting section 3 and the second light outputting section 4 is located in the imaginary central plane Pv, as shown in FIG. 5. The optical intensity distributions 3L and 4L shown in FIG. 5 show pointing element detectable optical intensity ranges of the first output light and the second output light, and the optical intensity distribution 20L shown in FIG. 5 shows a pointing element detectable optical intensity range of the combined light formed of the first output light and the second output light.

The light outputting apparatus 2 according to the present embodiment is so set as to efficiently output light along the projection surface SC, which has a horizontally elongated shape having a 2:1 ratio between the horizontal length and the vertical length.

It is desired that the light outputted from the light outputting apparatus 2 has a peak intensity at the right and left ends of the lower edge of the projection surface SC, each of which is the farthest position from the light outputting apparatus 2. To this end, the light outputting apparatus 2 according to the present embodiment is so configured that the inclination angle θa (see FIG. 3) of the first light outputting section 3 is set at −45° and the inclination angle θb (see FIG. 3) of the second light outputting section 4 is set at 45° on the assumption that an angle measured counterclockwise with respect to the imaginary central plane Pv is a positive (+) angle.

The first light outputting section 3 thus outputs light having a center axis extending in a first inclination direction inclining toward one side with respect to the imaginary central plane Pv. The second light outputting section 4 outputs light having a center axis extending in a second inclination direction inclining toward the other side with respect to the imaginary central plane Pv. The inclination angles θa and θb described above correspond to the projection surface SC having the aspect ratio described above. It is therefore desired that in a case where the target projection surface SC has a different shape (projection surface SC having aspect ratio of 16:9 or 4:3, for example), different angles are set in correspondence with the shape.

P-polarized light is incident on the first optical element 33 and the second optical element 43, as described above. The amount of reflection of the light emitted from the first light source 31 and the second light source 41 and reflected off the first optical element 33 and the second optical element 43 is thus suppressed, whereby the light from the light sources 31 and 41 is effectively used.

Figure 6:
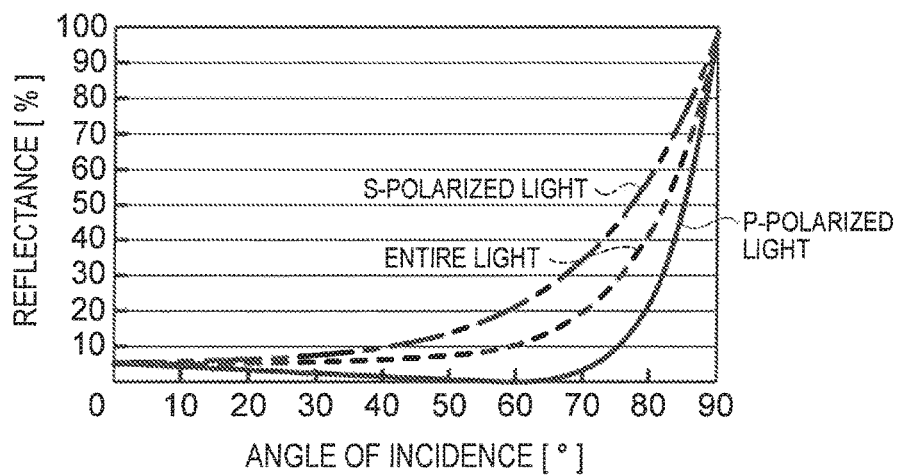
FIG. 6 shows graphs illustrating the relationship between the angle of incidence of light incident on the material of optical elements in the first embodiment and the reflectance of the light reflected off the material.

FIG. 6 shows graphs illustrating the relationship between the angle of incidence of light incident on the material of the first optical element 33 and the second optical element 43 in the present embodiment and the reflectance of the light reflected off the material.

The reflectance of the light increases with the angle of incidence, as shown in FIG. 6. Comparison of the reflectance of the light between the case where the incident light is P-polarized light and the case where the incident light is S-polarized light shows that the reflectance of S-polarized light is higher than that of P-polarized light. That is, as for the transmittance of the light that passes through the material of the first optical element 33 and the second optical element 43, the transmittance of P-polarized light is higher than that of S-polarized light. The reflectance of the entire light containing the P-polarized light and the S-polarized light is a value between the reflectance of S-polarized light and the reflectance of P-polarized light.

Figure 7:
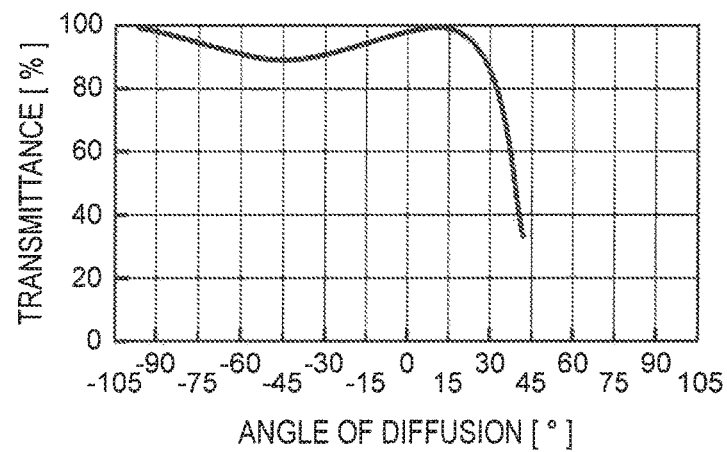
FIG. 7 is a graph showing the transmittance of the light passing through a first optical element in the first embodiment and showing the result of a simulation of the relationship between the angle of diffusion and the transmittance in a case where P-polarized light is incident on the first optical element.
Figure 8:
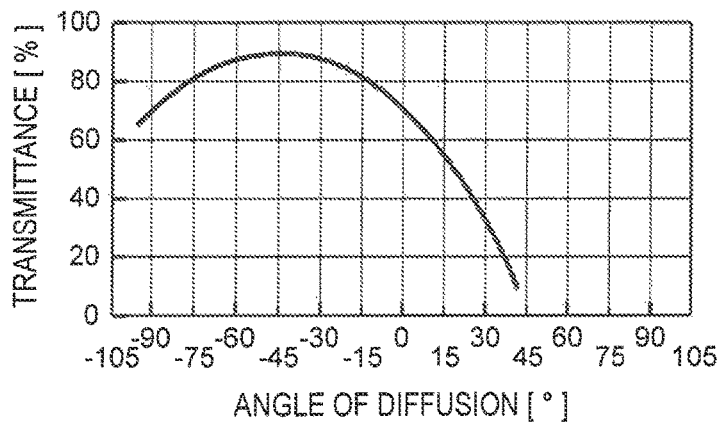
FIG. 8 is a graph for comparison with the graph in FIG. 7 and is a graph showing the result of a simulation of the relationship between the angle of diffusion and the transmittance in a case where S-polarized light is incident on the first optical element unlike the situation in the present embodiment.

FIG. 7 is a graph showing the transmittance of the light passing through the first optical element 33 in the light outputting apparatus 2 according to the present embodiment and showing the result of a simulation of the relationship between the angle of diffusion and the transmittance in the case where P-polarized light is incident on the first optical element 33. FIG. 8 is a graph for comparison with the graph in FIG. 7 and showing the result of a simulation of the relationship between the angle of diffusion and the transmittance in the case where S-polarized light is incident on the first optical element 33 unlike the situation in the present embodiment. The angle of diffusion used herein is the angle with respect to the imaginary central plane Pv (see FIG. 5).

The transmittance of S-polarized light and transmittance of P-polarized light passing through the first optical element 33 are as follows: In the case of light having an angle of diffusion of −45°, that is, the light traveling in the direction along the optical axis 3A (see FIG. 3), the transmittance of P-polarized light is comparable to the transmittance of S-polarized light; and in the case of light having an angle of diffusion smaller than −45° or greater than −45°, the transmittance of P-polarized light is higher than the transmittance of S-polarized light. For example, in a case where the angle of diffusion is 0° or in a case where the angle of diffusion is −90°, the transmittance of S-polarized light is about 70%, whereas the transmittance of P-polarized light is at least 90%.

The graph showing the transmittance of light passing through the second optical element 43 and the graph showing the transmittance of light passing through the first optical element 33 are symmetric with respect to the imaginary central plane Pv. The transmittance of S-polarized light and transmittance of P-polarized light passing through the optical element 43 are as follows: In the case of light having an angle of diffusion of 45°, that is, the light traveling in the direction along the optical axis 4A (see FIG. 3), the transmittance of P-polarized light is comparable to the transmittance of S-polarized light; and in the case of light having an angle of diffusion greater than 45° or smaller than 45°, the transmittance of P-polarized light is higher than the transmittance of S-polarized light.

As described above, the light outputting apparatus 2 is so configured that P-polarized light is incident on the first optical element 33 and the second optical element 43, whereby the light from each of the first light source 31 and the second light source 41 is effectively used.

An example of the optical element unit 34U (referred to as optical element unit 34Ua) will now be specifically described. Since the first optical element 33 and the second optical element 43 are so formed that they are symmetric with respect to the imaginary central plane Pv, the description will be made by focusing on the first optical element 33.

Figure 9:
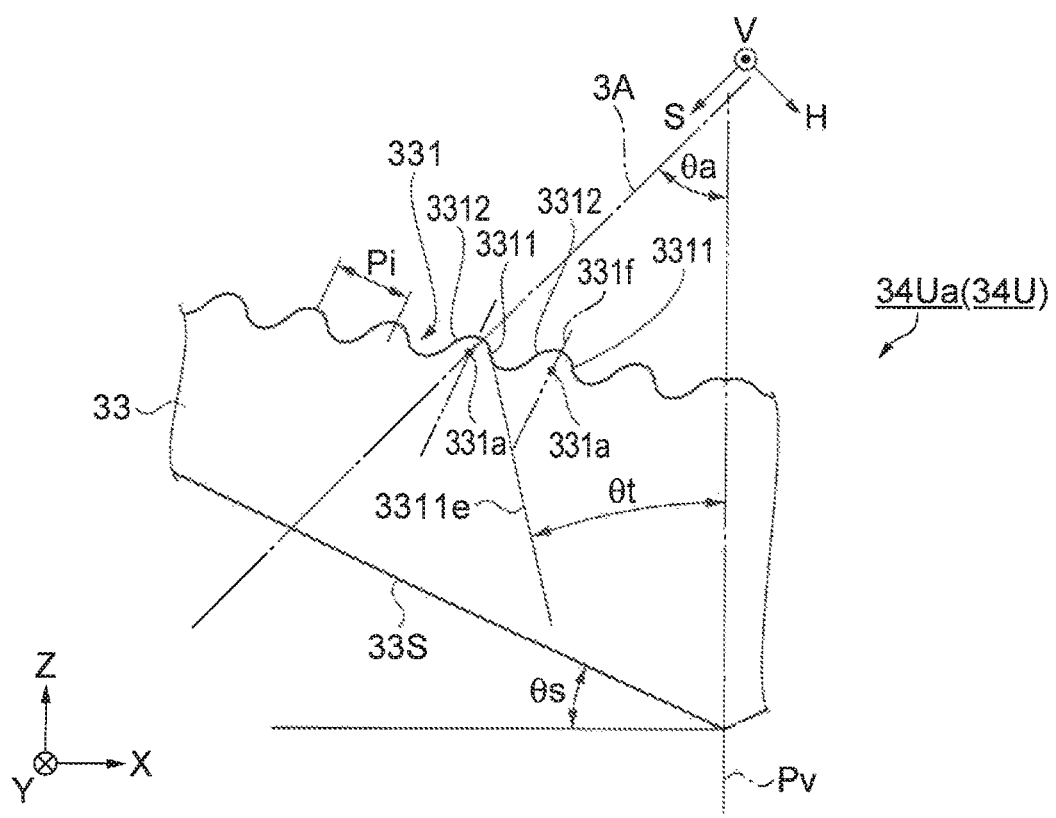
FIG. 9 is a partial plan view of an optical element unit and describes the shape of the first optical element.

FIG. 9 is a partial plan view of the optical element unit 34Ua and describes the shape of the first optical element 33.

The plurality of lenslets 331 of the first optical element 33 each has a center axis 331a, which extends in the second direction V, and is formed as an aspheric surface asymmetric with respect to a first lens central plane 331f, which contains the center axis 331a and is perpendicular to the first reference surface 33S, as shown in FIG. 9. Specifically, the lenslets 331 each have a first surface 3311, which faces the imaginary central plane Pv with respect to the first lens central plane 331f, and a second surface 3312, which faces the side opposite the first surface 3311 with respect to the first lens plane surface 331f.

The shape of each of the first surface 3311 and the second surface 3312 is expressed by the following Expression (1).

$$z = \frac{h^2/r}{1 + \sqrt{1-(k+1)(h/r)^2}} + \sum A_i h^i \quad (1)$$

In Expression (1), h represents the distance from the origin, r represents the radius of curvature, and k represents the conic constant.

FIG. 10 shows lens data on the lenslets 331. The lens data shown in FIG. 10 are obtained with respect to the first reference surface 33S on the assumption that the reference surface angle θs is 25°. In FIG. 10 and FIG. 11, the latter of which will be described later, 10 raised to some power ($1.11 \times 10^{+05}$, for example) is expressed by using E (1.11E+05). The plurality of lenslets 331 in the present embodiment are formed at intervals Pi of 1 mm.

The plurality of lenslets 431 of the second optical element 43 are so shaped that the shape of the plurality of lenslets 431 and the shape of the plurality of lenslets 331 of the first optical element 33 are symmetric with respect to the imaginary central plane Pv. The fact that the lenslets 331 and 431 are each asymmetrically formed allows the light emitted from the first light source 31 and the second light source 41 to be used at increased efficiency, which will be described later.

The lenslets 331 and 431 are so shaped that the optical element unit 34Ua can be molded by using a die that moves in the Z direction. This will be specifically described by focusing on the lenslets 331.

The lenslets 331 are each so formed that the first surface 3311 faces the +X side (side facing imaginary central plane Pv) and the second surface 3312 faces the +Z side, as shown in FIG. 9. The second surface 3312 can apparently be formed by using a die that moves in the Z direction. The first surface 3311 inclines in such a way that the distance from the imaginary central plane Pv to the first surface 3311 increases as a tangent 3311e, which is tangential to the first surface 3311, advances in the +Z direction, as shown in FIG. 9. The first surface 3311 is so formed that the angle between the imaginary central plane Pv and the tangent 3311e (tangential angle θt) is at least about 7°. The angle of about 7° corresponds to what is called drafts required in die molding and is an angle that allows molding using a die that moves in the Z direction.

In a molding process using a die that moves in the Y direction, that is, in the direction in which the lenslets 331 and 431 extend, the lenslets 331 and 431 each need to be so shaped as to have a surface (drafts) that inclines with respect to the extending direction, and it is therefore difficult to mold the lenslets 331 and 431 with precision.

On the other hand, since the optical element unit 34Ua in the present embodiment is so formed as to be moldable by using a die that moves in the Z direction, the plurality of lenslets 331 and 431 can be formed with precision.

Another example of the optical element unit 34U will be described.

For example, an optical element unit 34U having lens data shown in FIG. 11 with the reference surface angle θs set at 17° can be formed (referred to as optical element unit 34Ub), although the shape of the optical element unit 34Ub is not illustrated. The lens data on the optical element unit 34Ub shown in FIG. 11 are obtained with respect to the first reference surface 33S, as in the case of the optical element unit 34Ua.

The optical element unit 34Ua is more readily molded by using a die that moves in the Z direction because the tangential angle θt is greater than or equal to about 22°.

The optical element unit 34U is not limited to the optical element unit 34Ua or 34Ub described above. For example, an optical element unit 34U having a reference surface angle θs ranging from 17° to 25° can be formed.

The intensity distribution of the light outputted from the light outputting apparatus 2 in the area along the projection surface SC will now be described with reference to FIGS. 5 and 12.

Figure 12:
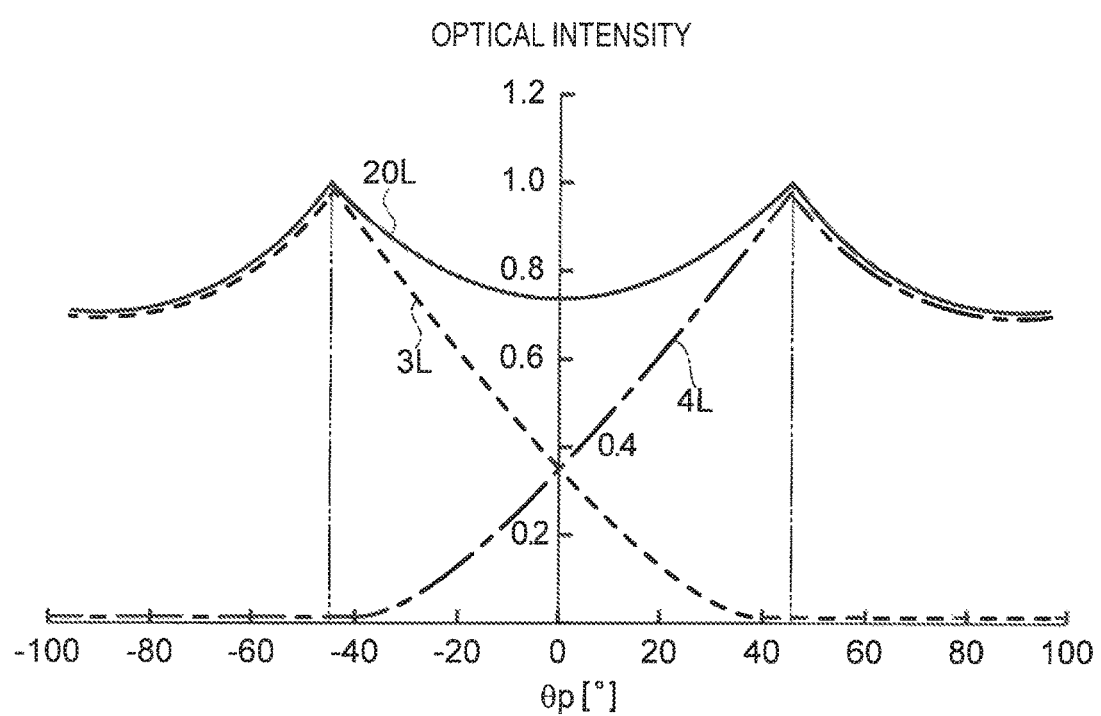
FIG. 12 shows the intensity distribution of the light outputted from the light outputting apparatus in the first embodiment.

FIG. 12 shows the intensity distribution of the light outputted from the light outputting apparatus 2 and further shows the relationship between an angle θp with respect to the imaginary central plane Pv (see FIG. 5) and the optical intensity. Specifically, FIG. 12 shows the intensity distribution 3L of the first output light, the intensity distribution 4L of the second output light, and the intensity distribution 20L of the combined light that is the combination of the first output light and the second output light.

The optical intensity of the first output light peaks at an angle θp of −45°, that is, in the direction of the center axis of the light outputted by the first light outputting section 3 (first inclination direction), as indicated by the intensity distribution 3L in FIG. 12. The light having the peak optical intensity is outputted toward the left (−X-side) end of the lower edge of the projection surface SC, that is, the position farthest from the first light outputting section 3 in the area that is part of the projection surface SC and irradiated with the light from the first light outputting section 3.

Since the lenslets 331 are each asymmetrically shaped, the optical intensity distribution 3L of the first output light shows that the optical intensity in the area where the angle θp is smaller than −45° is lower than the optical intensity of the first output light in the area where the angle θp is greater than −45° (side facing imaginary central plane Pv), as shown in FIG. 12.

Specifically, the intensity of the first output light decreases as the angle θp decreases beyond −45°, that is, as the point of interest changes from the left end of the lower edge of the projection surface SC toward the left end of the upper edge of the projection surface SC in accordance with the distance from the light outputting apparatus 2 to the left edge of the projection surface SC, as indicated by the intensity distribution 3L in FIGS. 5 and 12. Further, the first output light has pointing element detectable optical intensity in the area where the angle θp is smaller than −45°, as indicated by the intensity distribution 3L in FIG. 5.

Further, the intensity of the first output light decreases as the angle θp increases beyond −45°, that is, the point of interest changes from the left end of the lower edge of the projection surface SC toward the imaginary central plane Pv. The degree of the decrease is greater than the degree of the decrease in the area where the angle θp is smaller than −45°. The first output light is outputted also to the right (+X-side) of the imaginary central plane Pv in the area along the projection surface SC, and the intensity of the light outputted rightward (toward +X side) is particularly low.

On the other hand, the intensity distribution 4L of the second output light is so configured that the intensity distribution 3L of the first output light and the intensity distribution 4L of the second output light are symmetric with respect to the angle θp of 0°, and part of the second output light overlaps with part of the first output light on both sides of the imaginary central plane Pv, as shown in FIGS. 5 and 12.

As described above, the first light outputting section 3 outputs the highest intensity light in the first inclination direction and further outputs light to the other area in such a way that the intensity of the light traveling in the direction inclining toward the imaginary central plane Pv with respect to the first inclination direction is lower than the intensity of the light traveling in the direction inclining toward the side opposite the imaginary central plane Pv with respect to the first inclination direction. The second light outputting section 4 outputs the highest intensity light in the second inclination direction and further outputs light to the other area in such a way that the intensity of the light traveling in the direction inclining toward the imaginary central plane Pv with respect to the second inclination direction is lower than the intensity of the light traveling in the direction inclining toward the side opposite the imaginary central plane Pv with respect to the second inclination direction.

The first output light and the second output light overlap with each other in the area where the angle θp ranges from about 40° to about −40°, as shown in FIG. 12, where the overlapping light has pointing element detectable optical intensity. The intensity of the light outputted from the light outputting apparatus 2 (combined light formed of first output light and second output light) is maximized at the angles θp of 45° and −45° and smoothly decreases in the area where the angle θp has the other values, as indicated by the intensity distribution 20L in FIG. 12. That is, the light outputted from the light outputting apparatus 2 travels along the entire projection surface SC in such a way that the light has the intensity corresponding to the distance from the light outputting apparatus 2 to each edge of the projection surface SC, that is, the pointing element detectable optical intensity, as indicated by the intensity distribution 20L in FIG. 5.

As described above, the light outputted from the light outputting apparatus 2 is optimized in terms of the optical intensity across the entire area along the projection surface SC. The projector 1 can therefore detect the position of the pointing element on the projection surface SC with accuracy.

As described above, the light outputting apparatus 2 and the image display system 100 according to the present embodiment can provide the following advantageous effects.

(1) The light outputting apparatus 2, which includes the first light outputting section 3 and the second light outputting section 4, which output light fluxes having center axes extending in directions different from each other, can effectively use the light fluxes emitted from the first light source 31 and the second light source 41 to output light along the wide projection surface SC.

Further, the first light outputting section 3 and the second light outputting section 4 are so disposed that the optical paths thereof intersect each other at a point between the collimator lenses and the optical elements, as described above. The light outputting apparatus 2 can therefore be configured with the first optical element 33 and the second optical element 43 close to each other, and the portion where part of the light outputted by the first light outputting section 3 and part of the light outputted by the second light outputting section 4 overlap with each other is allowed to approach the projection surface SC. The light outputting apparatus 2 can therefore be reduced in size in the rightward/leftward direction (X direction) and can output light having sufficient optical intensity in an area close to the light outputting apparatus 2.

(2) The image display system 100, which includes the light outputting apparatus 2, can effectively use the light fluxes emitted from the first light source 31 and the second light source 41 to output light from one side of the projection surface SC, such as a screen and a whiteboard, along the projection surface SC. The image display system 100 can therefore stably detect the position of the pointing element or any other object that reflects the light outputted along the projection surface SC, project an image according to the result of the detection, for example, an image containing the trajectory of the pointing element on the projection surface SC, change the image, and perform other types of operation in a reliable manner.

Further, the light outputting apparatus 2, which can be disposed in a position close to the projection surface SC, allows a wide area where the position of the pointing element or any other object can be detected on the projection surface SC on the side facing the light outputting apparatus 2.

(3) Since the light from the light emitting portion that is part of the first light source 31 and is smaller in the second direction V than in the first direction H is incident on the first collimator lens 32, the light having exited out of the first collimator lens 32 is light more parallelized in the second direction V than in the first direction H. The first optical element 33 then widens the light incident thereon only in the direction corresponding to the first direction H. Similarly, the light having exited out of the second collimator lens 42 is light more parallelized in the second direction V than in the first direction H in the second light source 41. The second optical element 43 then widens the light incident thereon only in the direction corresponding to the first direction H. The light outputting apparatus 2 can therefore suppress diffraction and efficiently output light along the projection surface SC over a wider range.

(4) In the light outputting apparatus 2, the first optical element 33 and the second optical element 43 include the plurality of lenslets 331 and 431, respectively, and the light fluxes outputted from the first light outputting section 3 and the second light outputting section 4 are formed of the light fluxes widened by the plurality of lenslets 331 and 431 and superimposed on one another. The first light outputting section 3 can therefore provide sufficient optical intensity in the entire area along the projection surface SC even in a case where the precision in the alignment between the first light source 31 and the first optical element 33 is relaxed, unlike the configuration in which the member that widens light incident thereon is formed of a single lens. Similarly, the second light outputting section 4 can provide sufficient optical intensity in the entire area along the projection surface SC even in a case where the precision in the alignment between the second light source 41 and the second optical element 43 is relaxed.

The light outputting apparatus 2 provided by the present embodiment therefore allows the assembly man-hour (position adjustment man-hour) to be reduced and sufficient optical intensity to be ensured over the entire area along the projection surface SC.

Further, the degree of dependence on the intensity distribution of the light emitted from each of the first light source 31 and the second light source 41 can be reduced, whereby the first light source 31 and the second light source 41 can be selected with increased flexibility.

(5) In the light outputting apparatus 2, the first optical element 33 and the second optical element 43 are integrated with each other. The area where the first optical element 33 and the second optical element 43 are disposed can therefore be reduced. Further, since the relative positional precision between the first optical element 33 and the second optical element 43 can be increased, the discrepancy between the intensity distribution of the light outputted by the first light outputting section 3 and the intensity distribution of the light outputted by the second light outputting section 4 can be suppressed. The light outputting apparatus 2 provided by the present embodiment therefore allows further reduction in the size thereof in the rightward/leftward direction and can output light having further suppressed offset in the optical intensity distribution in the area along the projection surface SC.

(6) In the light outputting apparatus 2, the first collimator lens 32 and the first optical element 33 are disposed along the optical axis 3A of the first light source 31, and the second collimator lens 42 and the second optical element 43 are disposed along the optical axis 4A of the second light source 41. The first light outputting section 3 and the second light outputting section 4 output widened light fluxes having center axes that coincide with the optical axes 3A and 4A of the first light source 31 and the second light source 41, respectively. Further, in the light outputting apparatus 2, the first optical path 3Lp and the second optical path 4Lp intersect each other, as described above. Therefore, the size of the light outputting apparatus 2 in the rightward/leftward direction can be reduced, and loss of the light fluxes emitted by the first light source 31 and the second light source 41 can be suppressed, whereby the light outputting apparatus 2 provided by the present embodiment can efficiently output light along the projection surface SC.

(7) The light outputting apparatus 2 includes the first light outputting section 3, which outputs light having a center axis extending in the first inclination direction, which inclines toward one side with respect to the imaginary central plane Pv, and the second light outputting section 4, which outputs light having a center axis extending in the second inclination direction, which inclines toward the other side with respect to the imaginary central plane Pv. The light outputting apparatus 2 can therefore efficiently output light along the wide projection surface SC with the light toward the vicinities of the farthest corners of the rectangular projection surface SC having increased intensity.

(8) In the light outputting apparatus 2, the plurality of lenslets 331 and 431 are each asymmetrically formed as described above. The light outputting apparatus 2 can therefore output light having a sufficient optical intensity distribution that allows stable detection of the pointing element across the entire area along the rectangular projection surface SC with no increase in the intensity of the light from the first light source 31 and the second light source 41. The light outputting apparatus 2 provided by the present embodiment can therefore efficiently output light having an appropriate optical intensity distribution over the areas along the projection surface SC that are separate from the light outputting apparatus 2 by different distances.

(9) Since the light outputting apparatus 2 is so configured that P-polarized light is incident on the first optical element 33 and the second optical element 43, reflection at the first optical element 33 and the second optical element 43 can be suppressed, whereby the light emitted from each of the first light source 31 and the second light source 41 can be effectively used.

(10) Since the light outputting apparatus 2 outputs light that belongs to a band of wavelengths (about 940 nm) longer than the wavelength of light used by a remote control or any other device or the wavelength of light primarily emitted from a fluorescent lamp, malfunction of the projector 1 due to the light emitted from a remote control or a fluorescent lamp is avoided, and the projector 1 can therefore stably detect the position of the pointing element on the projection surface SC and project an image according to the result of the detection.

Second Embodiment

A light outputting apparatus 500 according to a second embodiment will be described below with reference to the drawings. In the following description, the same components as those of the light outputting apparatus 2 according to the first embodiment have the same reference characters, and detailed descriptions of the same components will be omitted or simplified.

Figure 13:
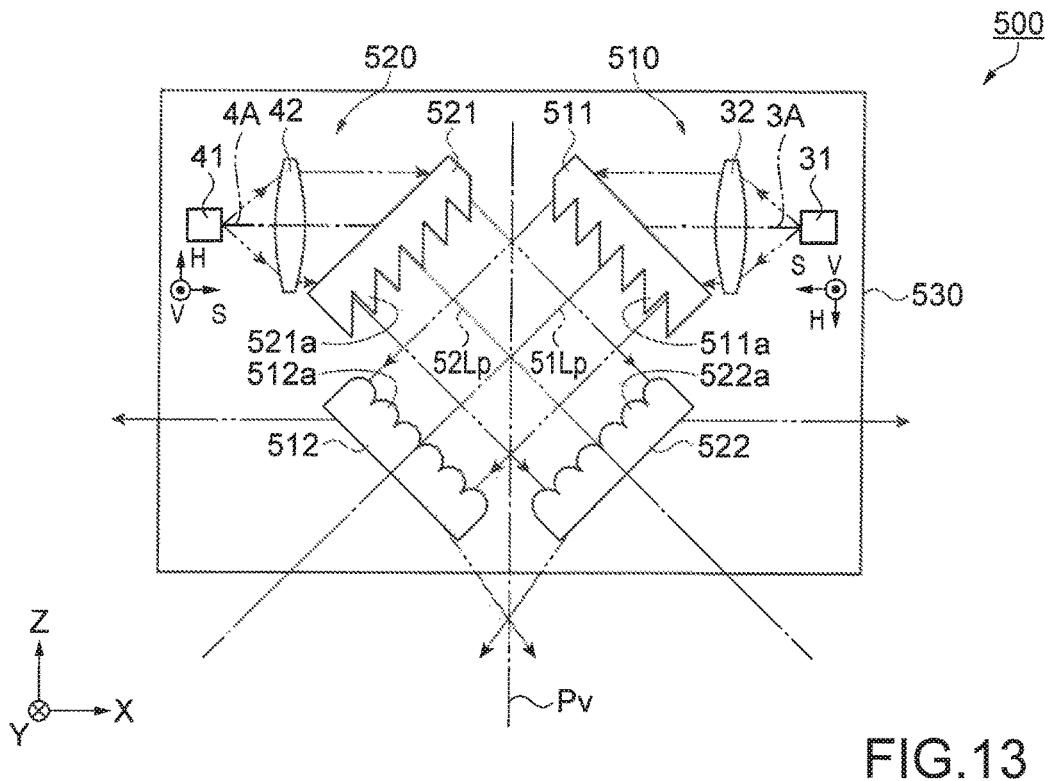
FIG. 13 is a diagrammatic view showing a schematic configuration of a light outputting apparatus according to a second embodiment.

FIG. 13 is a diagrammatic view showing a schematic configuration of the light outputting apparatus 500 according to the present embodiment.

The light outputting apparatus 500 includes a first light outputting section 510, a second light outputting section 520, and an enclosure 530, as shown in FIG. 13.

The first light outputting section 510 includes a first prism array 511 and a first optical element 512 including a plurality of lenslets 512a in addition to the first light source 31 and the first collimator lens 32. The second light outputting section 520 has the same configuration as that of the first light outputting section 510 and includes a second prism array 521 and a second optical element 522 including a plurality of lenslets 522a in addition to the second light source 41 and the second collimator lens 42. The first prism array 511 corresponds to a first direction changer, and the second prism array 521 corresponds to a second direction changer.

The first light source 31 and the second light source 41 are so arranged as to each emit light toward the side facing the other. Specifically, the first light source 31 is so arranged as to emit light from the +X side of the imaginary central plane Pv toward the second light source 41, and the second light source 41 is so arranged as to emit light from the −X side of the imaginary central plane Pv toward the first light source 31. The arrangement in which the first light source 31 and the second light source 41 are so arranged as to each emit light toward the side facing the other is not limited to the arrangement in which the first light source 31 and the second light source 41 are so arranged that the optical axes 3A and 4A are on the same straight line and includes an arrangement in which the first light source 31 and the second light source 41 are arranged with the optical axes 3A and 4A shifted from each other and an arrangement in which the first light source 31 and the second light source 41 are arranged with the angle of the optical axis 3A with respect to the imaginary central plane Pv different from the angle of the optical axis 4A with respect to the imaginary central plane Pv.

The collimator lens 32 is disposed on the −X side of the first light source 31 (side facing imaginary central plane Pv).

The first prism array 511 has a flat surface on the light incident side (side facing first collimator lens 32) and includes a plurality of prisms 511a on the light exiting side (side facing first optical element 512). The prisms 511a are each formed in a triangular prismatic shape extending in the second direction V and in correspondence with the lenslets 512a of the first optical element 512. The first prism array 511 is so disposed that the light-incident-side flat surface thereof intersects the optical axis 3A and the plurality of prisms 511a incline and face obliquely leftward and downward. The first prism array 511 refracts the light having passed through the first collimator lens 32 to change the traveling direction of the light toward the second light source 41 to a direction toward the −Z side of the second light source 41.

The first optical element 512 is so configured that the lenslets 512a face the prisms 511a of the first prism array 511, has a flat surface opposite the lenslets 512a and perpendicular to the optical axis of the light incident on the first optical element 512, widens the light in the first direction H having passed through the first prism array 511, and outputs the resultant light having a center axis extending obliquely leftward and downward. That is, the first optical element 512 widens the light incident thereon in the first predetermined direction (direction corresponding to first direction H perpendicular to optical axis 3A).

The second light outputting section 520 is so configured that each component of the first light outputting section 510 and the corresponding component of the second light outputting section 520 are symmetric with respect to the imaginary central plane Pv.

The second prism array 521 includes a plurality of prisms 521a corresponding to the lenslets 522a of the second optical element 522 and refracts the light having passed through the second collimator lens 42 to change the traveling direction of the light toward the first light source 31 to a direction toward the −Z side of the first light source 31.

The second optical element 522 widens the light in the first direction H having passed through the second prism array 521, and outputs the resultant light having a center axis extending obliquely rightward and downward. That is, the second optical element 522 widens the light incident thereon in the second predetermined direction (direction corresponding to first direction H perpendicular to optical axis 4A).

In the light outputting apparatus 500, an optical path 51Lp extending from the first light source 31 to the first optical element 512 and an optical path 52Lp extending from the second light source 41 to the second optical element 522 intersect each other at a point on upstream optical paths of the first optical element 512 and the second optical element 522. Specifically, the first optical path 51Lp and the second optical path 52Lp intersect each other at a point between the first prism array 511 and the first optical element 512 and between the second prism array 521 and the second optical element 522.

As described above, the light outputting apparatus 500 includes the first prism array 511 and the second prism array 521, and the area where the first light source 31 and the second light source 41 are disposed is close in the upward/downward direction to the area where the first optical element 512 and the second optical element 522 are disposed.

The light outputting apparatus 500 outputs light having appropriate optical intensity across the entire area along the projection surface SC, as the light outputting apparatus 2 in the first embodiment does.

As described above, the light outputting apparatus 500 according to the present embodiment can provide the following advantageous effects.

(1) In the light outputting apparatus 500, the area where the first light source 31 and the second light source 41 are disposed is close in the upward/downward direction to the area where the first optical element 512 and the second optical element 522 are disposed. Further, in the light outputting apparatus 500, the first optical path 51Lp and the second optical path 52Lp intersect each other, as described above. The light outputting apparatus 500 provided by the present embodiment therefore allows reduction in the size thereof in the upward/downward direction and arrangement closer to the projection surface SC. Further, in a case where a connection portion (not shown) via which electric power is supplied to the first light source 31 and the second light source 41 is provided on the side opposite the light exiting side, a cable connected to the connection portion and other components can be so disposed not as to protrude in the upward/downward direction, whereby the size of the light outputting apparatus 500 in the upward/downward direction can be further reduced.

(2) The image display system including the light outputting apparatus 500 provides a remarkable effect, for example, in an application in which a projector is installed above a projection surface. For example, in a case where a whiteboard is used as the projection surface SC and the projector 1 is installed at the upper end of the whiteboard via a support fixture, the light outputting apparatus 500 is disposed below the support fixture. However, the compact size of the light outputting apparatus 500 allows a wide effective area where a pointing element can be detected on the projection surface SC to be provided in an upper portion of the projection surface SC.

Third Embodiment

A light outputting apparatus 600 according to a third embodiment will be described below with reference to the drawings. In the following description, the same components as those of the light outputting apparatus 2 according to the first embodiment have the same reference characters, and detailed descriptions of the same components will be omitted or simplified.

Figure 14:
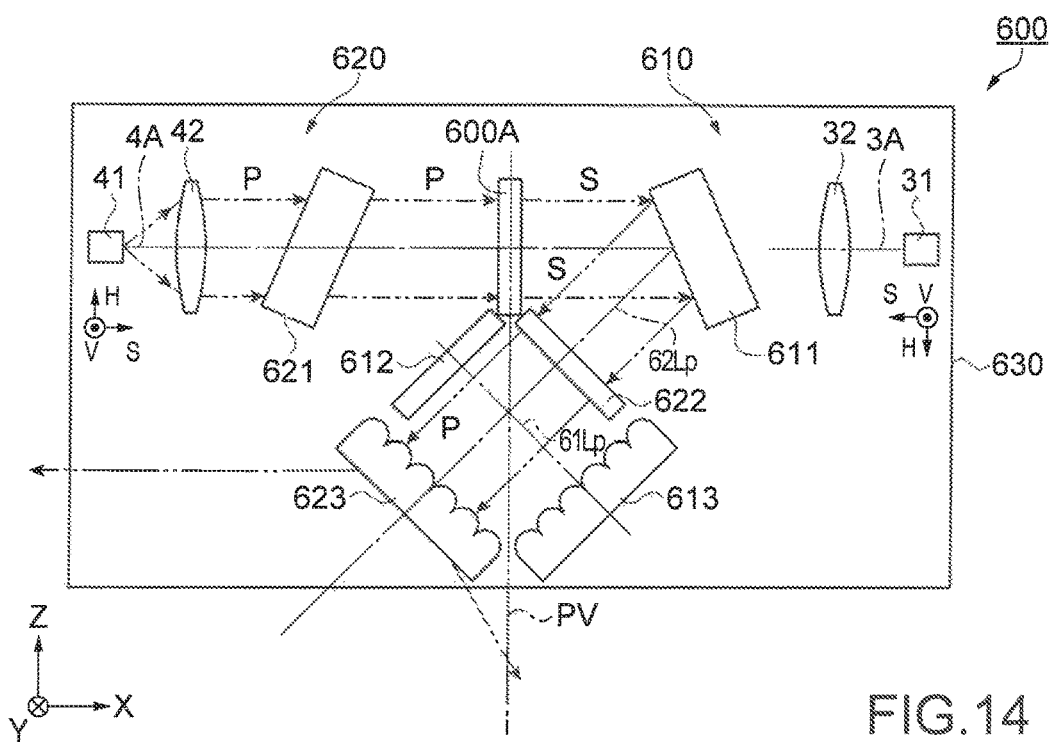
FIG. 14 is a diagrammatic view showing a schematic configuration of a light outputting apparatus according to a third embodiment.

FIG. 14 is a diagrammatic view showing a schematic configuration of the light outputting apparatus 600 according to the present embodiment.

The light outputting apparatus 600 includes a first light outputting section 610, a second light outputting section 620, a first retardation element 600A, and an enclosure 630, as shown in FIG. 14. FIG. 14 shows the light traveling direction in the second light outputting section 620 but no light traveling direction in the first light outputting section 610 for clarification of the light traveling direction.

The first light outputting section 610 includes a first polarization element 611, a second retardation element 612, and a first optical element 613 in addition to the first light source 31 and the first collimator lens 32. The second light outputting section 620 is so configured that each component of the first light outputting section 610 and the corresponding component of the second light outputting section 620 are symmetric with respect to the imaginary central plane Pv, and the second light outputting section 620 includes a second polarization element 621, a third retardation element 622, and a second optical element 623 in addition to the second light source 41 and the second collimator lens 42.

The first light source 31 and the second light source 41 are so arranged as to each emit light toward the side facing the other. Specifically, the first light source 31 is so disposed as to emit light from the +X side of the imaginary central plane Pv toward the second light source 41, and the second light source 41 is so disposed as to emit light from the −X side of the imaginary central plane Pv toward the first light source 31.

The description will first be made by focusing on the second light outputting section 620.

The second collimator lens 42 is disposed on the +X side of the second light source 41.

The second polarization element 621 has the function of transmitting P-polarized light and reflecting S-polarized light and is disposed in a position downstream of the second collimator lens 42 on the optical path. The second polarization element 621 is so disposed as to incline with respect to the optical axis 4A and have a surface facing the imaginary central plane Pv and obliquely rightward and downward. The second polarization element 621 transmits P-polarized light having passed through the second collimator lens 42 and incident on the second polarization element 621. P-polarized light corresponds to first polarized light, and S-polarized light corresponds to second polarized light.

The first retardation element 600A, the second retardation element 612, and the third retardation element 622 each have the function of converting one of P-polarized light and S-polarized light incident thereon into the other.

The first retardation element 600A is disposed between the first polarization element 611 and the second polarization element 621 and converts the P-polarized light having passed through the second polarization element 621 into S-polarized light.

The first polarization element 611 in the first light outputting section 610 is so disposed that the first polarization element 611 and the second polarization element 621 are symmetric with respect to the imaginary central plane Pv and is further so disposed as to have a surface facing the imaginary central plane Pv and obliquely leftward and downward. The S-polarized light into which the P-polarized light having passed through the second polarization element 621 has been converted by the first retardation element 600A is reflected off the first polarization element 611.

The third retardation element 622 is so disposed as to face the first polarization element 611 and converts the S-polarized light reflected off the first polarization element 611 into P-polarized light.

The second optical element 623 includes lenslets on the light incident side and a flat surface located on the light exiting side and perpendicular to the optical axis of the light incident on the second optical element 623. The second optical element 623 widens the P-polarized light into which the S-polarized light reflected off the first polarization element 611 and then converted by the third retardation element 623 and outputs the resultant light having a center axis extending obliquely leftward and downward. That is, the second optical element 623 widens the light incident thereon in the second predetermined direction (direction corresponding to first direction H perpendicular to optical axis 4A).

The first light outputting section 610 is so configured that each component of the first light outputting section 610 and the corresponding component of the second light outputting section 620 are symmetric with respect to the imaginary central plane Pv, as described above. Specifically, the P-polarized light having been emitted from the first light source 31 and having passed through the first collimator lens 32 and the first polarization element 611 is converted by the first retardation element 600A into S-polarized light, which is then reflected off the second polarization element 621. The first optical element 613 widens the P-polarized light into which the S-polarized light reflected off the second polarization element 621 and converted by the second retardation element 612 and outputs the resultant light having a center axis extending obliquely rightward and downward. That is, the first optical element 613 widens the light incident thereon in the first predetermined direction (direction corresponding to first direction H perpendicular to optical axis 3A).

In the light outputting apparatus 600, an optical path 61Lp extending from the first light source 31 to the first optical element 613 and an optical path 62Lp extending from the second light source 41 to the second optical element 623 intersect each other at a point on upstream optical paths of the first optical element 613 and the second optical element 623. Specifically, the first optical path 61Lp and the second optical path 62Lp intersect each other at a point between the second retardation element 612 and the first optical element 613 and between the third retardation element 622 and the second optical element 623.

As described above, the light outputting apparatus 600 includes the first polarization element 611, the second polarization element 621, and the three retardation elements (first retardation element 600A, second retardation element 612, and third retardation element 622), and the area where the first light source 31 and the second light source 41 are disposed is close in the upward/downward direction to the area where the first optical element 613 and the second optical element 623 are disposed.

The light outputting apparatus 600 outputs light having appropriate optical intensity across the entire area along the projection surface SC, as the light outputting apparatus 2 in the first embodiment does.

As described above, the light outputting apparatus 600 according to the present embodiment can provide the following advantageous effect in addition to the advantageous effects provided by the light outputting apparatus 500 according to the second embodiment.

The area where the first light source 31 and the second light source 41 are disposed and the area where the first optical element 613 and the second optical element 623 are disposed are allowed to be close to each other with use of no special member for changing the traveling directions of the light fluxes from the first light source 31 and the second light source 41. The light outputting apparatus 600 is therefore formed of readily manufacturable members and allows reduction in the size thereof in the upward/downward direction.

Fourth Embodiment

A light outputting apparatus 700 according to a fourth embodiment will be described below with reference to the drawings. In the following description, the same components as those of the light outputting apparatus 2 according to the first embodiment have the same reference characters, and detailed descriptions of the same components will be omitted or simplified.

Figure 15:
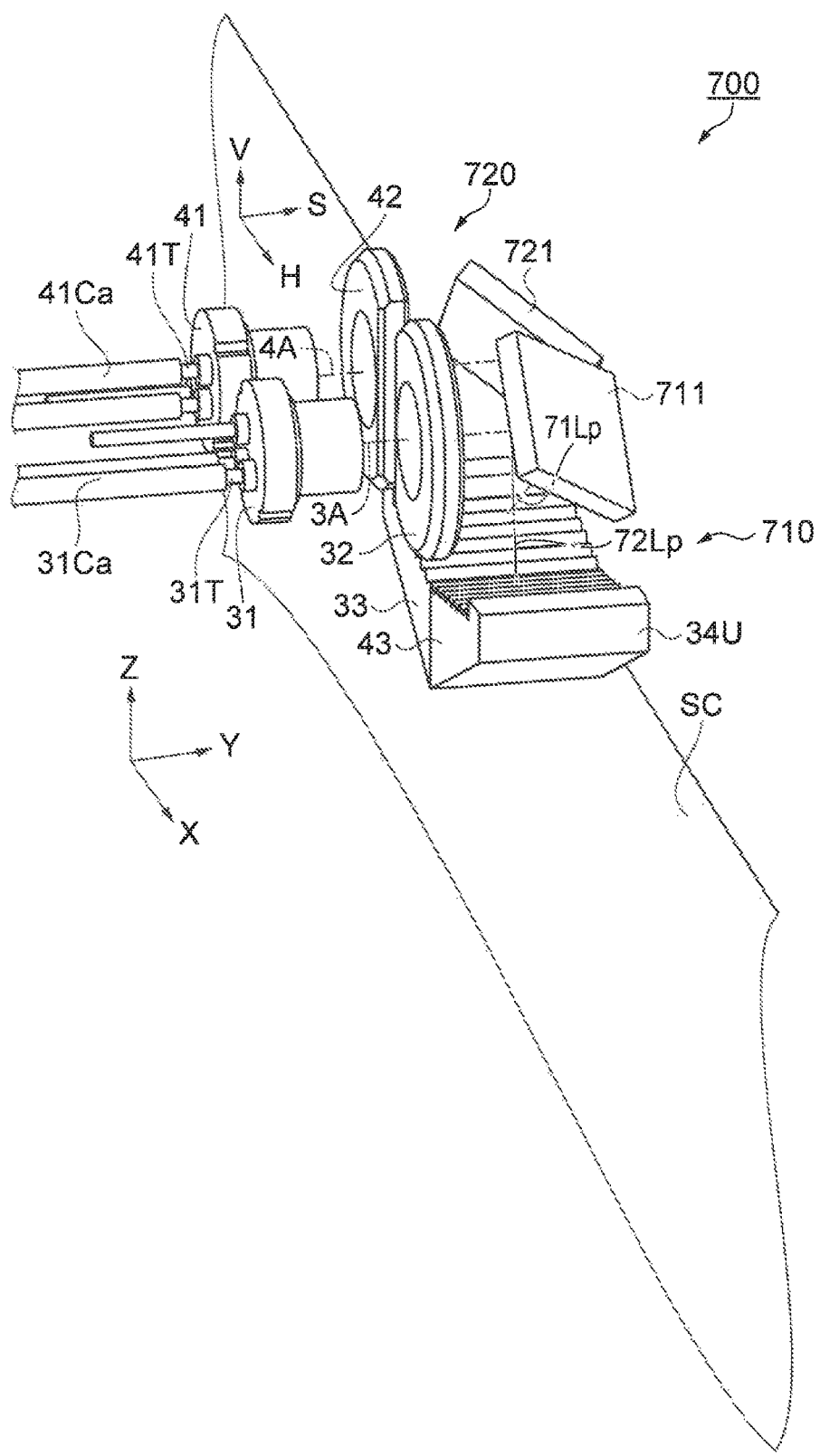
FIG. 15 is a perspective view diagrammatically showing a schematic configuration of a light outputting apparatus according to a fourth embodiment.
Figure 16:
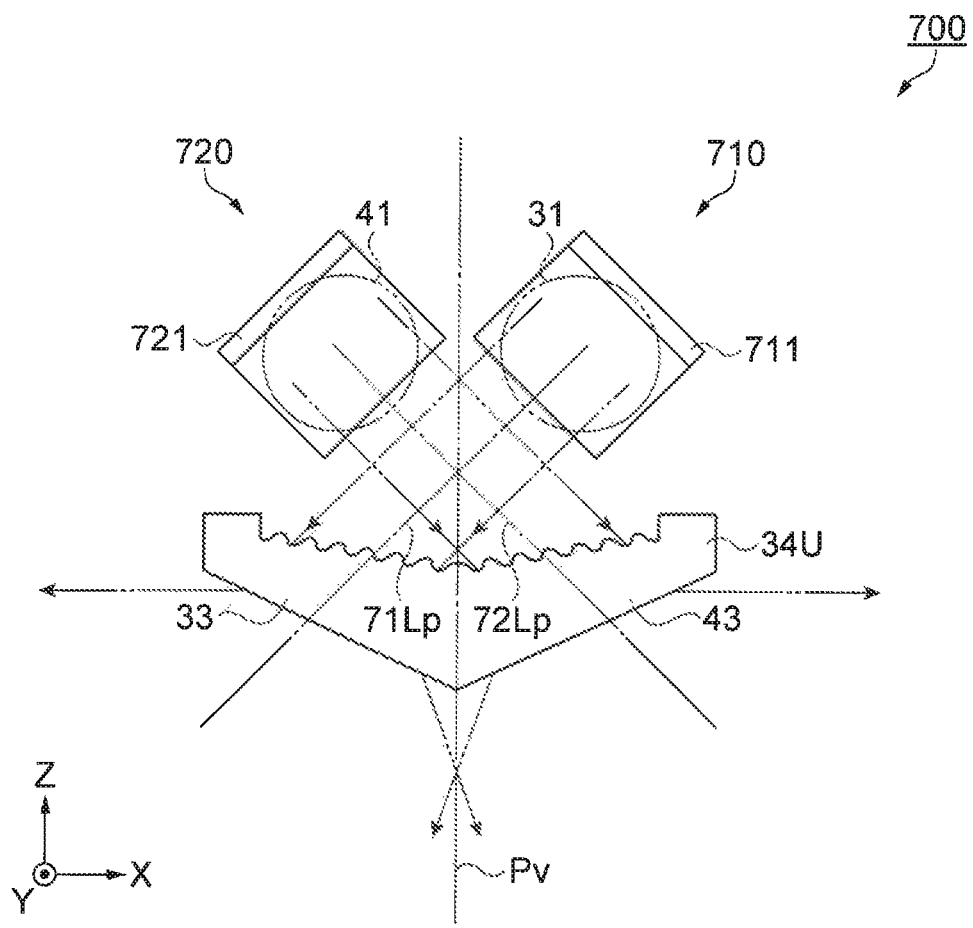
FIG. 16 is a diagrammatic view of the light outputting apparatus according to the fourth embodiment viewed from the rear (−Y side).

FIG. 15 is a perspective view diagrammatically showing a schematic configuration of the light outputting apparatus 700 according to the present embodiment. FIG. 16 is a diagrammatic view of the light outputting apparatus 700 viewed from the side facing the projection surface SC (−Y side).

The light outputting apparatus 700 includes a first light outputting section 710, a second light outputting section 720, and an enclosure that is not shown, as shown in FIGS. 15 and 16.

The first light outputting section 710 includes a first mirror 711 and the first optical element 33 in addition to the first light source 31 and the first collimator lens 32. The second light outputting section 720 has the same configuration as that of the first light outputting section 710 and includes a second mirror 721 and the second optical element 43 in addition to the second light source 41 and the second collimator lens 42. The first optical element 33 and the second optical element 43 are integrated with each other into the optical element unit 34U, as described in the first embodiment.

The first light source 31 and the second light source 41 are so disposed as to be close to each other with the first light source 31 located on the right of the second light source 41 (+X side). The first light source 31 and the second light source 41 are further so disposed as to emit light fluxes toward the same side (+Y side), specifically, toward an upward portion of the projection surface SC. Further, the first light source 31 and the second light source 41 have terminals 31T and 41T, which are provided on the side opposite the light exiting side and to which electric power is supplied, as shown in FIG. 15. Cables 31Ca and 41Ca, which are connected to a power source that is not shown, are connected to the terminals 31T and 41T, respectively.

The first collimator lens 32 is disposed on the +Y-side of the first light source 31.

The first mirror 711 is so disposed on the +Y side of the first collimator lens 32 as to incline with respect to the optical axis 3A. The first mirror 711 reflects the light having passed through the first collimator lens 32 in a direction that intersects the optical axis 3A, specifically, an obliquely leftward and downward direction, as shown in FIG. 16.

The first optical element 33 widens the light in the first direction H reflected off the first mirror 711 and outputs the resultant light having a center axis extending obliquely leftward and downward. That is, the first optical element 33 widens the light incident thereon in the first predetermined direction (direction corresponding to first direction H perpendicular to optical axis 3A).

The second light outputting section 720 is so configured that each component of the first light outputting section 710 and the corresponding component of the second light outputting section 720 are symmetric with respect to the imaginary central plane Pv. The light having been emitted from the second light source 42 and having passed through the second collimator lens 42 is reflected off the second mirror 721 and incident on the second optical element 43. The second optical element 43 widens the light in the first direction H reflected off the second mirror 712 and outputs the resultant light having a center axis extending obliquely rightward and downward. That is, the second optical element 43 widens the light incident thereon in the second predetermined direction (direction corresponding to first direction H perpendicular to optical axis 4A).

In the light outputting apparatus 700, an optical path 71Lp extending from the first light source 31 to the first optical element 33 and an optical path 72Lp extending from the second light source 41 to the second optical element 43 intersect each other at a point on upstream optical paths of the first optical element 33 and the second optical element 43. Specifically, the first optical path 71Lp and the second optical path 72Lp intersect each other at a point between the first mirror 711 and the first optical element 33 and between the second mirror 721 and the second optical element 43.

As described above, the light outputting apparatus 700 includes the first mirror 711 and the second mirror 712, and the first light source 31 and the second light source 41 are so disposed as to be close to each other. Further, in the light outputting apparatus 700, the first light source 31 and the second light source 41 are so disposed as to be closer to the optical element unit 34U when viewed from the side facing the projection surface SC.

The light outputting apparatus 700 outputs light having appropriate optical intensity across the entire area along the projection surface SC, as the light outputting apparatus 2 in the first embodiment does.

As described above, the light outputting apparatus 700 according to the present embodiment can provide the following advantageous effect in addition to the advantageous effects provided by the light outputting apparatus 500 according to the second embodiment.

In the light outputting apparatus 700, the first light source 31 and the second light source 41 are so disposed as to be close to each other, and the first light source 31 and the second light source 41 are so disposed as to be closer to the optical element unit 34U when viewed from the side facing the projection surface SC. The light outputting apparatus 700 provided by the present embodiment can thus be further compact.

Variations

The embodiments described above may be changed as follows.

In the light outputting apparatus 2, 700 according to the first and fourth embodiments, the first optical element 33 and the second optical element 43 are integrated with each other. The first optical element 33 and the second optical element 43 may instead be so formed as to be separate from each other.

For example, a light outputting apparatus may be configured to include the first optical element 512 and the second optical element 522 in the light outputting apparatus 500 according to the second embodiment in place of the optical element unit 34U in the light outputting apparatus 2. Similarly, a light outputting apparatus may be configured to include the first optical element 512 and the second optical element 522 in the light outputting apparatus 500 according to the second embodiment in place of the optical element unit 34U in the light outputting apparatus 700.

In the light outputting apparatus 500 according to the second embodiment, the first optical element 512 and the second optical element 522 are elements separate from each other but may instead be integrated with each other. Similarly, in the light outputting apparatus 600 according to the third embodiment, the first optical element 613 and the second optical element 623 may be integrated with each other.

The light outputting apparatus 2 according to the first embodiment uses the light sources 31 and 41, which emit P-polarized light, and may instead use light sources that emit S-polarized light. In this configuration, it is desirable that a retardation element is further so provided that P-polarized light is incident on the first optical element 33 and the second optical element 43. The same holds true for the light outputting apparatus 500 and 700 in other embodiments.

The light outputting apparatus 600 according to the third embodiment includes the three retardation elements (first retardation element 600A, second retardation element 612, and third retardation element 622). It is instead conceivable to configure a light outputting apparatus including the first retardation element 600A but no second retardation element 612 or third retardation element 622. In this configuration, S-polarized light corresponds to the first polarized light and P-polarized light corresponds to the second polarized light, and the first and second polarization elements are configured to have the function of transmitting the first polarized light (S-polarized light) and reflecting the second polarized light (P-polarized light). In the following stage, the first optical element widens the second polarized light (P-polarized light) reflected off the second polarization element, and the second optical element widens the second polarized light (P-polarized light) reflected off the first polarization element.

The collimator lenses 32 and 42 may instead be each so configured that the curvature of the lens surface in the first direction H differs from the curvature of the lens surface in the second direction V. For example, collimator lenses 32 and 42 having curvature that allows the incident light in the second direction V to be parallelized and causes the incident light in the first direction H to travel as slightly non-parallelized light allow further suppression of the diffraction.

The lenslets 331 and 431 in the optical elements 33 and 43 in the embodiments described above are each asymmetrically formed. Instead, in a light outputting apparatus used in a system that permits variation in the optical intensity, optical elements each including symmetrically formed lenslets may be used.

In the first optical element 33 and the second optical element 43 in the embodiments described above, the plurality of lenslets 331 and 431 are regularly formed, but a configuration in which a plurality of lenslets having different sizes and arranged at different intervals may be employed.

The light sources 31 and 41 in the embodiments described above are each formed of a laser light source but not necessarily and may instead be each formed, for example, of a plurality of highly directional LEDs so arranged along one row that the arrangement direction coincides with the first direction H.

The above embodiments have been described with reference to the configuration in which the image display system 100 uses the front-projection-type projector 1, in which an image is projected from side facing the front side of the projection surface, but not necessarily, and any apparatus that displays an image may be employed. For example, a rear-projection-type projector, which projects an image from side facing the rear side of the screen may be employed, or the screen on which an image is projected may be replaced, for example, with a liquid crystal display, a CRT (cathode ray tube), a plasma display, or an organic EL display.

The entire disclosure of Japanese Patent Application No. 2017-62392, filed on Mar. 28, 2017 is expressly incorporated by reference herein.

What is claimed is:

1. A light outputting apparatus comprising a first light outputting section and a second light outputting section that output light fluxes having center axes extending in directions different from each other,
wherein the first light outputting section includes
a first light source that emits light,
a first collimator lens for parallelizing the light emitted from the first light source, and
a first optical element that widens in a first predetermined direction light having passed through the first collimator lens,
the second light outputting section includes
a second light source that emits light,
a second collimator lens for parallelizing the light emitted from the second light source, and
a second optical element that widens in a second predetermined direction light having passed through the second collimator lens, and
the first light outputting section and the second light outputting section are so disposed that a first optical path extending from the first light source to the first optical element and a second optical path extending from the second light source to the second optical element intersect each other at a point on upstream optical paths of the first optical element and the second optical element and part of the light outputted by the first light outputting section and part of the light outputted by the second light outputting section overlap with each other.

2. The light outputting apparatus according to claim 1,
wherein the first light source and the second light source each have a light emitting portion larger in a first direction perpendicular to an optical axis of the first light source than in a second direction perpendicular to an optical axis of the second light source and to the first direction,
the first predetermined direction is a direction corresponding to the first direction perpendicular to the optical axis of the first light source,
the second predetermined direction is a direction corresponding to the first direction perpendicular to the optical axis of the second light source,
the first optical element widens light incident thereon only in the first predetermined direction, and
the second optical element widens light incident thereon only in the second predetermined direction.

3. The light outputting apparatus according to claim 1,
wherein the first optical element includes a plurality of lenslets that are arranged along a direction corresponding to the first predetermined direction and widen light incident on the lenslets, and
the second optical element includes a plurality of lenslets that are arranged along a direction corresponding to the second predetermined direction and widen light incident on the lenslets.

4. The light outputting apparatus according to claim 1,
wherein the first optical element and the second optical element are integrated with each other.

5. The light outputting apparatus according to claim 1,
wherein the first collimator lens and the first optical element are disposed along an optical axis of the first light source,
the second collimator lens and the second optical element are disposed along an optical axis of the second light source, and
the first optical path and the second optical path intersect each other at a point between the first collimator lens and the first optical element and between the second collimator lens and the second optical element.

6. The light outputting apparatus according to claim 1,
wherein the first light source and the second light source are so disposed as to each emit light toward a side facing another,
the first light outputting section includes a first direction changer that changes a traveling direction of the light having passed through the first collimator lens,
the first optical element widens light having passed through the first direction changer,
the second light outputting section includes a second direction changer that changes a traveling direction of the light having passed through the second collimator lens,
the second optical element widens light having passed through the second direction changer, and
the first optical path and the second optical path intersect each other at a point between the first direction changer and the first optical element and between the second direction changer and the second optical element.

7. The light outputting apparatus according to claim 1,
wherein the first light source and the second light source are so disposed as to each emit light toward a side facing another,
the first light outputting section includes a first polarization element that is disposed in a downstream optical path of the first collimator lens, transmits first polarized light, and reflects second polarized light,
the second light outputting section includes a second polarization element that is disposed in a downstream optical path of the second collimator lens, transmits the first polarized light, and reflects the second polarized light,
the light outputting apparatus further includes a first retardation element that is disposed between the first polarization element and the second polarization element and converts the first polarized light into the second polarized light,
the first optical element widens light having passed through the first polarization element, having been converted by the first retardation element, and having been reflected off the second polarization element,
the second optical element widens light having passed through the second polarization element, having been converted by the first retardation element, and having been reflected off the first polarization element, and
the first optical path and the second optical path intersect each other at a point between the first optical element and the second polarization element and between the second optical element and the first polarization element.

8. The light outputting apparatus according to claim 7,
wherein the first light outputting section includes a second retardation element that is disposed between the first optical element and the second polarization element and converts the second polarized light into the first polarized light, the second light outputting section includes a third retardation element that is disposed between the second optical element and the first polarization element and converts the second polarized light into the first polarized light, the first optical element widens the first polarized light into which the second polarized light reflected off the second polarization element is converted by the second retardation element, the second optical element widens the first polarized light into which the second polarized light reflected off the first polarization element is converted by the third retardation element, and the first optical path and the second optical path intersect each other at a point between the second retardation element and the first optical element and between the third retardation element and the second optical element.

9. The light outputting apparatus according to claim 1, wherein the first light source and the second light source each emit light toward the same side, the first light outputting section includes a first mirror that reflects the light having passed through the first collimator lens in a direction that intersects an optical axis of the first light source, the first optical element widens the light reflected off the first mirror, the second light outputting section includes a second mirror that reflects the light having passed through the second collimator lens in a direction that intersects an optical axis of the second light source, the second optical element widens the light reflected off the second mirror, and the first optical path and the second optical path intersect each other at a point between the first mirror and the first optical element and between the second mirror and the second optical element.

10. An image display system comprising:
the light outputting apparatus according to claim 1;
a detection apparatus that detects a position where light outputted from the light outputting apparatus is reflected; and
a projection apparatus that projects an image according to a result of the detection performed by the detection apparatus.

11. An image display system comprising:
the light outputting apparatus according to claim 2;
a detection apparatus that detects a position where light outputted from the light outputting apparatus is reflected; and
a projection apparatus that projects an image according to a result of the detection performed by the detection apparatus.

12. An image display system comprising:
the light outputting apparatus according to claim 3;
a detection apparatus that detects a position where light outputted from the light outputting apparatus is reflected; and
a projection apparatus that projects an image according to a result of the detection performed by the detection apparatus.

13. An image display system comprising:
the light outputting apparatus according to claim 4;
a detection apparatus that detects a position where light outputted from the light outputting apparatus is reflected; and
a projection apparatus that projects an image according to a result of the detection performed by the detection apparatus.

14. An image display system comprising:
the light outputting apparatus according to claim 5;
a detection apparatus that detects a position where light outputted from the light outputting apparatus is reflected; and
a projection apparatus that projects an image according to a result of the detection performed by the detection apparatus.

15. An image display system comprising:
the light outputting apparatus according to claim 6;
a detection apparatus that detects a position where light outputted from the light outputting apparatus is reflected; and
a projection apparatus that projects an image according to a result of the detection performed by the detection apparatus.

16. An image display system comprising:
the light outputting apparatus according to claim 7;
a detection apparatus that detects a position where light outputted from the light outputting apparatus is reflected; and
a projection apparatus that projects an image according to a result of the detection performed by the detection apparatus.

17. An image display system comprising:
the light outputting apparatus according to claim 8;
a detection apparatus that detects a position where light outputted from the light outputting apparatus is reflected; and
a projection apparatus that projects an image according to a result of the detection performed by the detection apparatus.

18. An image display system comprising:
the light outputting apparatus according to claim 9;
a detection apparatus that detects a position where light outputted from the light outputting apparatus is reflected; and
a projection apparatus that projects an image according to a result of the detection performed by the detection apparatus.

* * * * *